US008095148B2

(12) United States Patent  (10) Patent No.: US 8,095,148 B2
Rekimoto  (45) Date of Patent: Jan. 10, 2012

(54) POSITION INFORMATION PROCESSING METHOD, POSITION INFORMATION PROCESSING SYSTEM, POSITION INFORMATION PROCESSING APPARATUS, COMMUNICATION APPARATUS AND PROGRAM

(75) Inventor: Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 966 days.

(21) Appl. No.: 11/876,527

(22) Filed: Oct. 22, 2007

(65) Prior Publication Data

US 2008/0254808 A1  Oct. 16, 2008

(30) Foreign Application Priority Data

Nov. 20, 2006  (JP) ................................. 2006-313425

(51) Int. Cl.
  *H04W 24/00* (2009.01)
  *H04M 11/00* (2006.01)
  *H04M 3/493* (2006.01)
  *G08B 1/08* (2006.01)
(52) U.S. Cl. ............... 455/456.1; 455/456.5; 455/456.6; 455/414.2; 455/407; 340/539.13
(58) Field of Classification Search ............... 455/456.1, 455/456.5, 456.6, 407, 414.2; 340/539.13
  See application file for complete search history.

(56) References Cited

U.S. PATENT DOCUMENTS

| 2004/0021566 A1* | 2/2004 | Hayashi et al. .......... 340/539.13 |
| 2005/0130669 A1* | 6/2005 | Mizugaki et al. .......... 455/456.1 |
| 2005/0278111 A1* | 12/2005 | Ujino ............. 701/200 |
| 2007/0265020 A1* | 11/2007 | Cuffaro ....................... 455/456.5 |
| 2008/0014963 A1* | 1/2008 | Takizawa et al. .......... 455/456.1 |
| 2008/0045234 A1* | 2/2008 | Reed ........................... 455/456.1 |

FOREIGN PATENT DOCUMENTS

| JP | 10-023398 | 1/1998 |
| JP | 10-282564 | 10/1998 |
| JP | 2000-292519 | 10/2000 |
| JP | 2001-94916 | 4/2001 |
| JP | 2003-134553 | 5/2003 |
| JP | 2005-045486 | 2/2005 |
| WO | WO 02/080540 A1 | 10/2002 |

* cited by examiner

*Primary Examiner* — Marivelisse Santiago Cordero
*Assistant Examiner* — Mong-Thuy Tran
(74) *Attorney, Agent, or Firm* — Finnegan, Henderson, Farabow, Garrett & Dunner, L.L.P.

(57) ABSTRACT

A position information processing method includes: measuring, at a communication apparatus, a signal intensity of a signal transmitted from a plurality of base stations; recording a history of signal intensity information at one or more times in a history storage medium of the communication apparatus; recording, in an information storage medium of the information recording apparatus, a specific time and information matching a position environment of the information recording apparatus at the specific time, respectively correlated to each other; calculating position information of the communication apparatus based on the history of signal intensity information recorded in the history storage medium, and known base station information constituted of the base station identification information and position information of the base stations; and correlating the calculated position information to the information matching the position environment stored in the medium and correlated to the specific time.

12 Claims, 16 Drawing Sheets

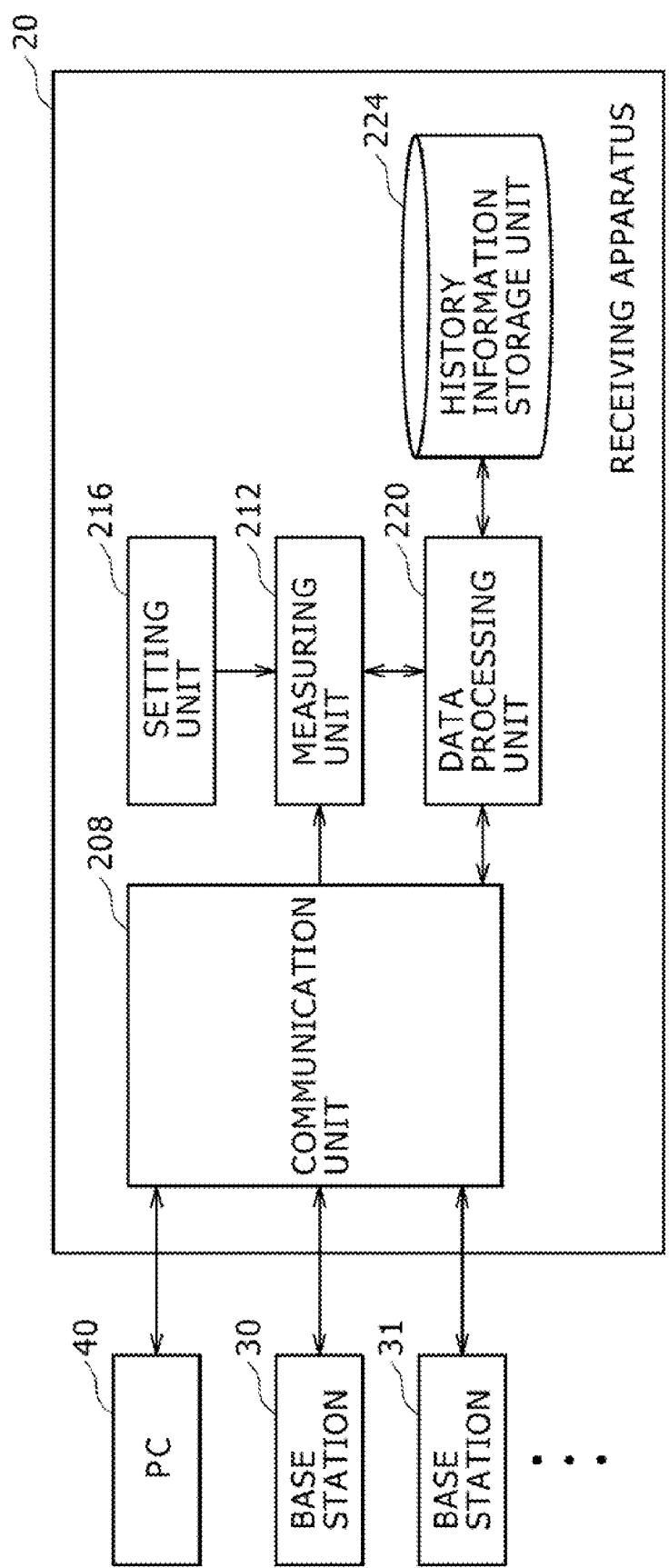

FIG. 4A

| MEASURE-MENT TIME | BASE STATION ID | SIGNAL INTENSITY |
|---|---|---|
| 2006 8/29 13:00:00 | 30 | −90Dbm |
| | 31 | −70Dbm |
| | 32 | −80Dbm |
| | 33 | −75Dbm |
| | ... | ... |

FIG. 4B

| MEASURE-MENT TIME | BASE STATION ID | SIGNAL INTENSITY |
|---|---|---|
| 2006 8/29 13:01:00 | 30 | −86Dbm |
| | 31 | −74Dbm |
| | 32 | −75Dbm |
| | 33 | −80Dbm |
| | ... | ... |

FIG. 4C

| MEASURE-MENT TIME | BASE STATION ID | SIGNAL INTENSITY |
|---|---|---|
| 2006 8/29 13:02:00 | 30 | −88Dbm |
| | 31 | −78Dbm |
| | 32 | −73Dbm |
| | 33 | −83Dbm |
| | ... | ... |

FIG.6
| PHOTOGRAPHIC INFORMATION | RECORD TIME |
|---|---|
| 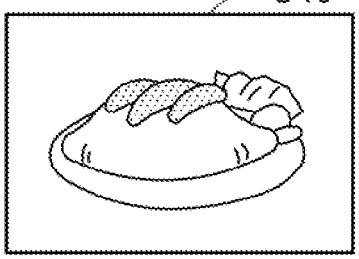 340 | 2006/8/30  14:20:11 |
| 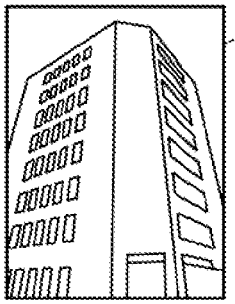 350 | 2006/8/29  13:30:01 |
| 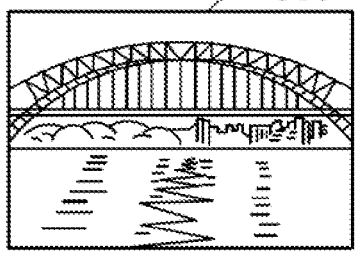 360 | 2006/8/28  17:56:25 |

FIG.8

| BASE STATION ID | LONGITUDE | LATITUDE |
|---|---|---|
| 30 | 135.001 | 35.49 |
| 31 | 135.002 | 35.41 |
| 32 | 135.003 | 35.50 |
| 33 | 135.002 | 35.42 |
| ⋮ | ⋮ | ⋮ |

FIG.9

| MEASUREMENT TIME | LONGITUDE | LATITUDE | ADDRESS |
|---|---|---|---|
| 2006/8/29 13:00:00 | 135.002 | 35.46 | AB PREFECTURE, C WARD, 5-CHOME |
| 2006/8/29 13:01:00 | 135.003 | 35.49 | AB PREFECTURE, C WARD, 4-CHOME |
| 2006/8/29 13:02:00 | 135.004 | 35.51 | AB PREFECTURE, C WARD, 1-CHOME |
| ⋮ | ⋮ | ⋮ | ⋮ |

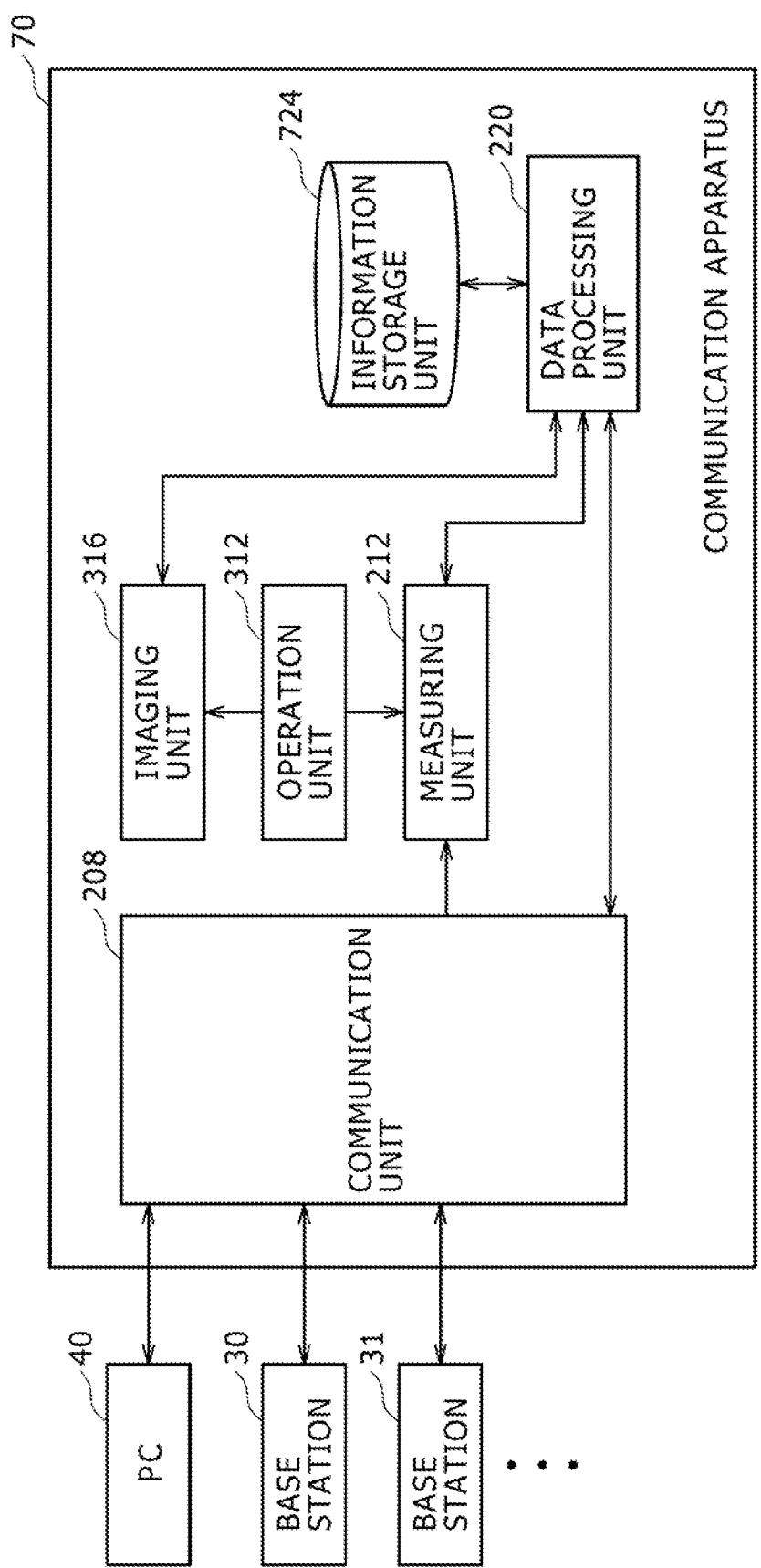

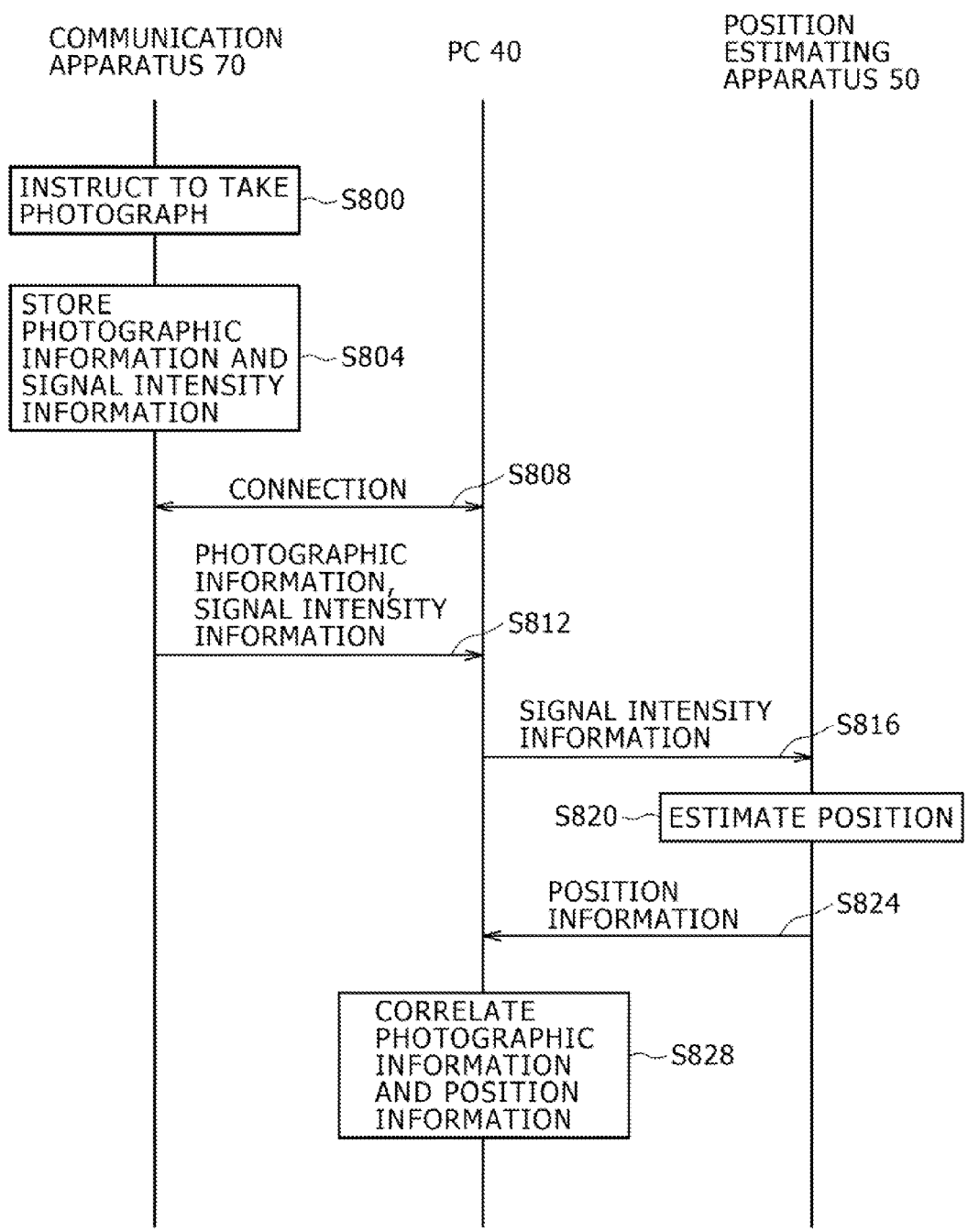

POSITION INFORMATION PROCESSING METHOD, POSITION INFORMATION PROCESSING SYSTEM, POSITION INFORMATION PROCESSING APPARATUS, COMMUNICATION APPARATUS AND PROGRAM

BACKGROUND OF THE INVENTION

1. Field of the Invention

The present invention relates to a position information processing method, a position information processing system, a position information processing apparatus, a communication apparatus and a program.

2. Description of Related Art

A receiving apparatus capable of receiving radio signals transmitted from a satellite is mounted nowadays on a mobile member such as a vehicle and a mobile phone. According to position measurement of a global positioning system (GPS), it is possible to estimate the position of a mobile member mounting the receiving apparatus of this type. The position estimating techniques using the receiving apparatus of this type are common infrastructural techniques important in a variety of fields such as navigation, security and amusement.

Japanese Unexamined Patent Application Publication No. 2001-94916 discloses an information processing method using an imaging apparatus which stores a correspondence between image data and record time when the image data is picked up, a GPS apparatus which stores at a predetermined interval a correspondence between position information and acquisition information for the position information, and an information processing apparatus which extracts an acquisition time near to the record time stored in the imaging apparatus from the GPS apparatus, and correlates the position information corresponding to the extracted acquisition time with the image data stored in correspondence with the record time.

SUMMARY OF THE INVENTION

The current technology information processing method is, however, associated with a problem that it takes a long time for the GPS apparatus to synchronously capture radio signals from a satellite. Further, if the GPS apparatus is located in the interior of a house or an underground room where radio signals from a satellite cannot reach the GPS apparatus, it is difficult to synchronously capture and hold radio signals from the satellite.

The present invention has been made in view of the above-described issue. According to embodiments of the present invention, there are provided a novel and improved position information processing method, position information processing system, position information processing apparatus, communication apparatus and program, capable of, even if information is recorded in the interior of a house or an underground room, correlating the recorded information with acquired position information.

According to an aspect of the present invention solving the above-described issue, there is provided a position information processing method using a communication apparatus capable of wireless communicating with a plurality of base stations, and an information recording apparatus capable of recording information matching an arbitrary position environment, including the steps of: measuring, at the communication apparatus, a signal intensity of a signal transmitted from each of the plurality of base stations; recording a history of signal intensity information at one or more times in a history storage medium of the communication apparatus, the history of signal intensity information including the measured signal intensity or information obtained from the measured signal intensity, base station identification information uniquely assigned to each of the base stations, and a time concerning measurement of the signal intensity, respectively correlated to each other; recording, in an information storage medium of the information recording apparatus, a specific time and information matching a position environment of the information recording apparatus at the specific time, respectively correlated to each other; calculating position information of the communication apparatus at the specific time based on the history of signal intensity information and known base station information constituted of the base station identification information, the history of signal intensity information being recorded in the history storage medium, and the known base station information being constituted of the base station identification information of the base stations and position information of the base stations correlated to each other; and correlating the calculated position information to the information matching the position environment, the information matching the position environment being correlated to the specific time and stored in the information storage medium.

With this configuration, for example, if the communication apparatus and information recording apparatus move along the same route, the information recorded by the information recording apparatus can be correlated at a later time to the position information indicating the position where the information recording apparatus recorded the information. If the base station and communication apparatus are in conformity with WiFi, the position information of the communication apparatus is calculated at a later time and correlated to the information recorded by the information recording apparatus, even if the communication apparatus is at a position such as an underground room and the interior of a house where radio waves from a satellite will not arrive, when the information recording apparatus recorded the information.

The information recording apparatus and the communication apparatus may be structured separately. With this configuration, for example, a user can correlate, at a later time, information recorded by the information recording apparatus to the position information of a position where the information recording apparatus recorded the information, by using an existing information recording apparatus. Namely, if a user desired to hold in hands a plurality of information processing apparatus, an existing information processing apparatus can be used without mounting a communication apparatus function on each information processing apparatus. It is therefore possible to reduce a cost of realizing the position information processing method.

The signal intensity in the measuring step may be measured at a predetermined time interval. With this configuration, for example, the communication apparatus measures a signal intensity at the predetermined time interval, and while the signal intensity is not measured, the communication apparatus may enter a sleep state. It is therefore possible to improve a retention time of the power source of the communication apparatus. It is also possible to set variable the measuring time interval of the signal intensity, based on a charge state of the power source of the communication apparatus and a signal intensity measuring period desired by a user.

The calculating step may calculate the position information of the communication apparatus at the specific time based on signal intensity information correlated to a time nearest to the specific time. With this configuration, if the signal intensity is measured intermittently, the position information of the communication apparatus at a specific time can be calculated in a simple manner by extracting a time nearest to the specific time and referring to the signal intensity information correlated to the extracted time, even if the same time as the specific time is not contained in the signal intensity information.

The calculating step may include the steps of: obtaining first position information calculated based on signal intensity information correlated to a first time nearest to the specific time and before the specific time; obtaining second position information calculated based on signal intensity information correlated to a second time nearest to the specific time and after the specific time; determining a weight coefficient for the first position information and the second position information, based on a ratio of a time from the first time to the second time to a time from the specific time to the second time; and calculating the position information of the communication apparatus at the specific time from the first position information and the second position information, by using the weight coefficients.

With this configuration, by measuring intermittently a signal intensity, more reliable position information of the communication apparatus at the specific time can be calculated even if signal intensity information at the same time as the specific time is not contained in the history of signal intensity information.

The information recording apparatus may be structured integrally with the communication apparatus. With this configuration, if a user holds in hands an information recording apparatus mounting a communication apparatus function or a communication apparatus mounting an information recording apparatus, the information recorded by the information recording apparatus or communication apparatus can be correlated at a later time to the position information of a position where the information recording apparatus or communication apparatus recorded the information. Namely, by structuring the information recording apparatus and communication apparatus integrally, it is possible to eliminate the problem that a user forgets to hold in hands one of the apparatus and eliminate a cumbersome problem that a user holds in hands a plurality of apparatus.

The position information processing method may further comprise the steps of: instructing, by the information recording apparatus, to measure the signal intensity at the specific time when recording the information matching the position environment of the information recording apparatus, wherein the signal intensity in the measuring step is measured in response to the instruction. With this configuration, the signal intensity is measured only at a necessary timing. As a result, more reliable position information of the communication apparatus at the specific time is calculated based on the signal intensity information correlated to the same time as the specific time, without using the position information calculated based on the signal intensity information correlated to the time nearest to the specific time.

In order to settle the above-described issue, according to another aspect of the present invention, there is provided a position information processing system including a communication apparatus for communicating with a plurality of base stations, a position information processing apparatus connectable to the communication apparatus, and an information recording apparatus capable of recording information matching an arbitrary position environment. The communication apparatus includes: a measuring unit for measuring a signal intensity of a signal transmitted from each of the plurality of base stations; a storage unit for storing a history of signal intensity information at one or more times, the history of signal intensity information including the signal intensity measured by the measuring unit or information obtained from the signal intensity, base station identification information uniquely assigned to each of the base stations, and a time concerning measurement of the signal intensity, respectively correlated to each other; and a transmitting unit for transmitting the history of signal intensity information stored in the storage unit to the position information processing apparatus. The position information processing apparatus includes: a signal intensity information receiving unit for receiving the history of signal intensity information from the communication apparatus; a record time receiving unit for receiving from the information recording apparatus a record time when the information recording apparatus recorded the information matching the position environment of the information recording apparatus; and a data processing unit for correlating the position information of the communication apparatus at the record time calculated based on the history of signal intensity information and known base station information constituted of the base station identification information of the base stations and position information of the base stations correlated to each other, to the information matching the position environment correlated to the record time and recorded by the information recording apparatus.

In order to settle the above-described issue, according to still another aspect of the present invention, there is provided a position information processing apparatus connectable to a communication apparatus capable of communicating with a plurality of base stations, comprising: a signal intensity information receiving unit for receiving from the communication apparatus a history of signal intensity information at one or more times, the history of signal intensity information including a signal intensity of a signal transmitted from each of the base stations and measured at the communication apparatus or information obtained from the signal intensity, base station identification information uniquely assigned to each of the base stations, and a time concerning measurement of the signal intensity, respectively correlated to each other; a record time receiving unit for receiving a record time when the information recording apparatus recorded information matching a position environment of the information recording apparatus, from an information recording apparatus capable of recording information matching an arbitrary position environment; and a data processing unit for correlating the position information of the communication apparatus at the record time calculated in accordance the history of signal intensity information and already known base station information constituted of the base station identification information of the base stations and position information of the base stations correlated to each other, to the information matching the position environment correlated to the record time and recorded by the information recording apparatus.

In order to settle the above-described issue, according to another aspect of the present invention, there is provided a communication apparatus capable of communicating with a plurality of base stations, comprising: a measuring unit of measuring a signal intensity of a signal transmitted from each of the plurality of base stations; a storage unit for storing a history of signal intensity information at one or more times, the history of signal intensity information including the signal intensity measured by the measuring unit or information obtained from the signal intensity, base station identification information uniquely assigned to each of the base stations, and a time concerning measurement of the signal intensity, respectively correlated to each other; and a transmitting unit for transmitting the history of signal intensity information stored in the storage unit to a position information processing apparatus capable of obtaining position information of the communication apparatus at a specific time by using the history of signal intensity information and already known base station information constituted of the base station identification information of the base stations and position information of the base stations correlated to each other.

The measuring unit may measure the signal intensity at a predetermined time interval. With this configuration, for example, the communication apparatus measures a signal intensity at the predetermined time interval, and while the signal intensity is not measured, the communication apparatus may enter a sleep state. It is therefore possible to improve a retention time of the power source of the communication apparatus. It is also possible to set variable the measuring time interval of the signal intensity, based on a charge state of the power source of the communication apparatus and a signal intensity measuring time interval desired by a user.

The communication apparatus may further comprise a recording unit for recording information matching a position environment of the communication apparatus in the storage unit, wherein the measuring unit measures the signal intensity based on a record of the information matching the position information of the communication apparatus. With this configuration, since the information recording apparatus function is mounted on the communication apparatus, the signal intensity is measured only at a necessary timing. As a result, more reliable position information of the communication apparatus at the specific time can be calculated based on the signal intensity information correlated to the same time as the specific time, without using the position information calculated based on the signal intensity information correlated to the time nearest to the specific time.

In order to settle the above-described issue, according to another aspect of the present invention, there is provided a program for making a computer execute: a measuring step of measuring a signal intensity of a signal transmitted from each of a plurality of base stations; a first recording step of recording a history of signal intensity information at one or more times in a history storage medium, the history of signal intensity information including the measured signal intensity or information obtained from the measured signal intensity, base station identification information uniquely assigned to each of the base stations, and a time based upon the measuring step, respectively correlated to each other; a second recording step of making an information recording apparatus capable of recording information matching a position information record in an information storage medium, information matching a position environment of the information recording apparatus at a specific time and the specific time, respectively correlated to each other; a calculating step of calculating position information of the communication apparatus at the specific time, based on the history of signal intensity information recorded in the history storage medium, and already known base station information constituted of the base station identification information of the base stations and position information of the base stations correlated to each other; and a data processing step of correlating the calculated position information to the information matching the position environment stored in the information storage medium and correlated to the specific time.

As described above, according to the present invention, even if information is recorded in the interior of a house or an underground room, the recorded information can be correlated with the acquired position information.

BRIEF DESCRIPTION OF THE DRAWINGS

FIG. 3 is a functional block diagram showing the structure of a receiving apparatus of the first embodiment.

FIGS. 4A to 4C are illustrative diagrams showing an example of signal intensity information stored in a history information storage unit.

FIG. 6 is an illustrative diagram showing examples of photographic information stored in a photographic information storage unit.

FIG. 8 is an illustrative diagram showing an example of base station information stored in a base station information storage unit.

FIG. 9 is an illustrative diagram showing an example of position information acquired by a position estimating unit.

FIG. 16 is a functional block diagram showing the structure of a receiving apparatus of the second embodiment.

FIG. 17 is a sequential diagram illustrating the whole operation flow of the position information processing system of the second embodiment.

DETAILED DESCRIPTION OF THE EMBODIMENTS

With reference to the accompanying drawings, preferred embodiments of the present invention will be described in detail. In the specification and drawings, constituent elements having substantially the same function and structure are represented by identical symbols, and the duplicated description thereof is omitted.

First Embodiment

First, a first embodiment of the present invention will be described. In the description of the first embodiment, a position information processing system of the first embodiment will be described first with reference to FIGS. 1 and 2, a receiving apparatus constituting the position information processing system will be described with reference to FIGS. 3 and 4, an imaging apparatus constituting the position information processing system will be described with reference to FIGS. 5 and 6, and correlating a photograph with position information will be described with reference to FIGS. 7 to 12, and a position information processing method for the position information processing system will be described with reference to FIG. 13.

Figure 1:
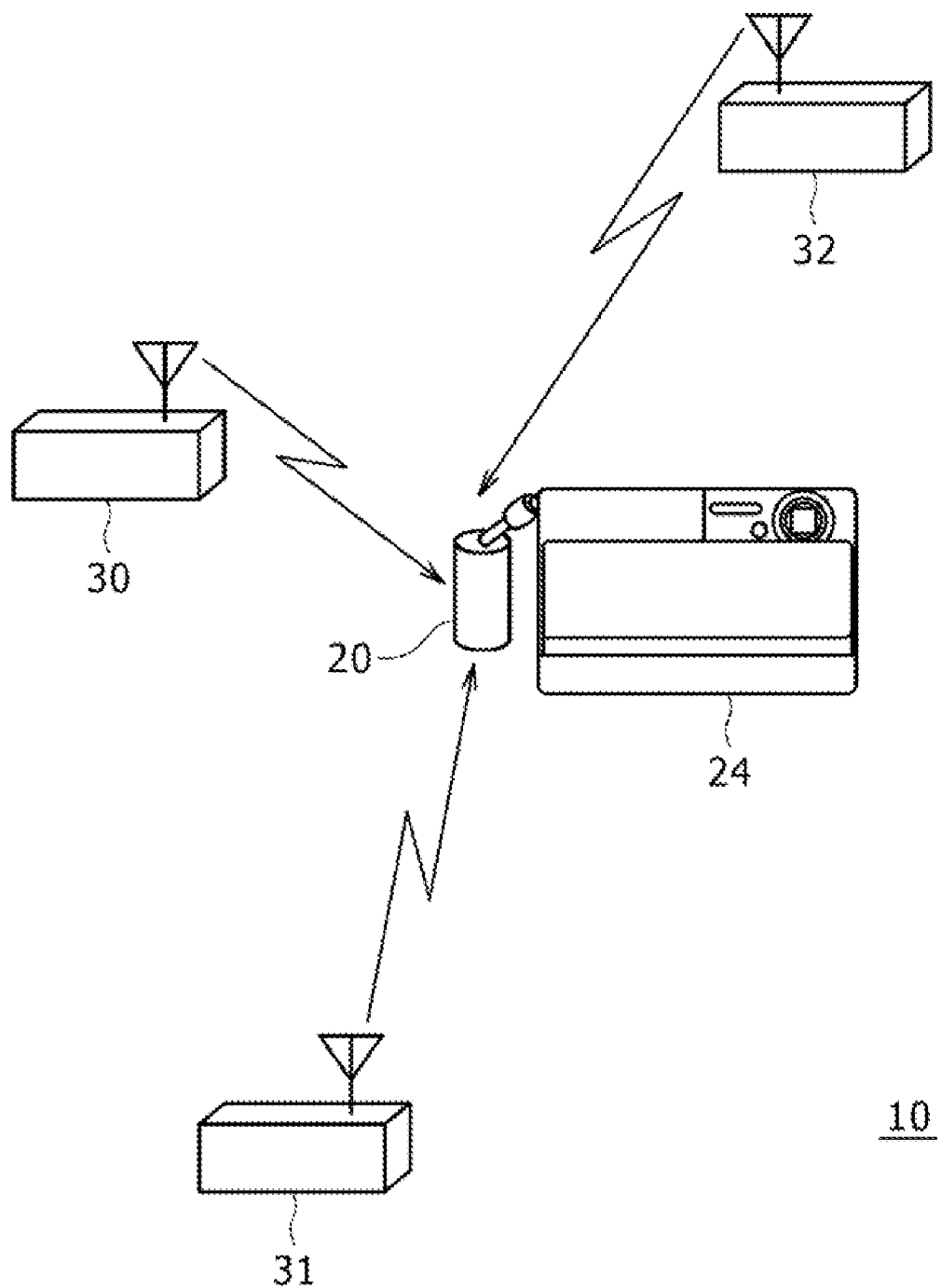
FIG. 1 is an illustrative diagram showing the configuration of a position information processing system during data collection according to a first embodiment of the present invention.

FIG. 1 is an illustrative diagram showing the configuration of a position information processing system 10 during data collection according to the first embodiment. The position information processing system 10 includes a receiving apparatus 20, an imaging apparatus 24, and base stations 30, 31 and 32.

The base stations 30, 31 and 32 relay communications among communication apparatus spatially distributed. For example, the base stations 30, 31 and 32 relays wireless communications between a wireless terminal and another wireless terminal existing in a radio wave arriving area of each base station, and relays communications with communication apparatus wired to the wireless terminal and base station 30, 31 or 32. More specifically, the base station 30 may be a base station of a wireless local area network (LAN) in conformity with the wireless fidelity (WiFi) specifications, a base station of global system for mobile communications (GSM) or a base station of Bluetooth. The structures of the base stations 30, 31 and 32 are substantially the same. Therefore, the base station 30 is used by way of example in the following description.

The base station 30 transmits periodically a beacon signal for notifying the surroundings of an existence of the base station, in addition to a signal which is transmitted when wireless communications are relayed. The beacon signal includes a base station ID, e.g., base station identification information uniquely assigned to the base station 30. The receiving apparatus 20 therefore confirms an existence of the base station 30 existing in the surroundings, based on the base station ID in the received beacon signal.

The receiving apparatus 20 functions as a communication apparatus for receiving a signal transmitted from the base station 30. Namely, the receiving apparatus 20 is provided with a wireless communication function matching the type of the base station, and may be a wireless LAN compatible apparatus in conformity with the WiFi specifications, a GSM compatible apparatus or a Bluetooth compatible apparatus. The receiving apparatus 20 may be a portable phone or a personal handyphone system (PHS) apparatus equipped with such a wireless communication function.

The receiving apparatus 20 measures a signal intensity of a signal (e.g., a beacon signal) received from the base station 30, correlates the measured signal intensity with the base station ID Of the base station transmitted the signal and a measurement time when the signal intensity of the signal was measured, and stores this correlation as signal intensity information.

The imaging apparatus 24 takes a photograph of an image matching a position environment of the imaging apparatus 24, and stores the taken photograph correlated with a record time. The position environment means the general environment of a location or nearby area of the imaging apparatus 24, and the image matching the position environment means a scene or landscape in the nearby area of the imaging apparatus 24. The imaging apparatus 24 and receiving apparatus 20 is connected, for example, by a connection device as shown in FIG. 1.

The imaging apparatus 24 is merely provided as an example of an information recording apparatus for recording information matching the position environment. The information recording apparatus may be a video camera, an audio recording apparatus, a climate recording apparatus or a storage medium.

If the information recording apparatus is a video camera, the information matching the position environment corresponds to a motion of an image in the nearby area of the video camera. If the information recording apparatus is an audio recording apparatus, the information matching the position environment corresponds audio information or sound wave information in the nearby area of the audio recording apparatus. If the information recording apparatus is a climate recording apparatus, the information matching the position information corresponds to a temperature, a humidity, a wind speed, weather and the like in the nearby area of the climate recording apparatus. If the information recording apparatus is a storage medium, the information matching the position environment corresponds to the contents in an information processing apparatus such as a PC in the environment connectable to the storage medium. The contents are arbitrary data such as music data including music, lectures, radio programs and the like, video data including movies, television programs, video programs, photographs, pictures, figures, tables and the like, games, software and the like.

Figure 2:
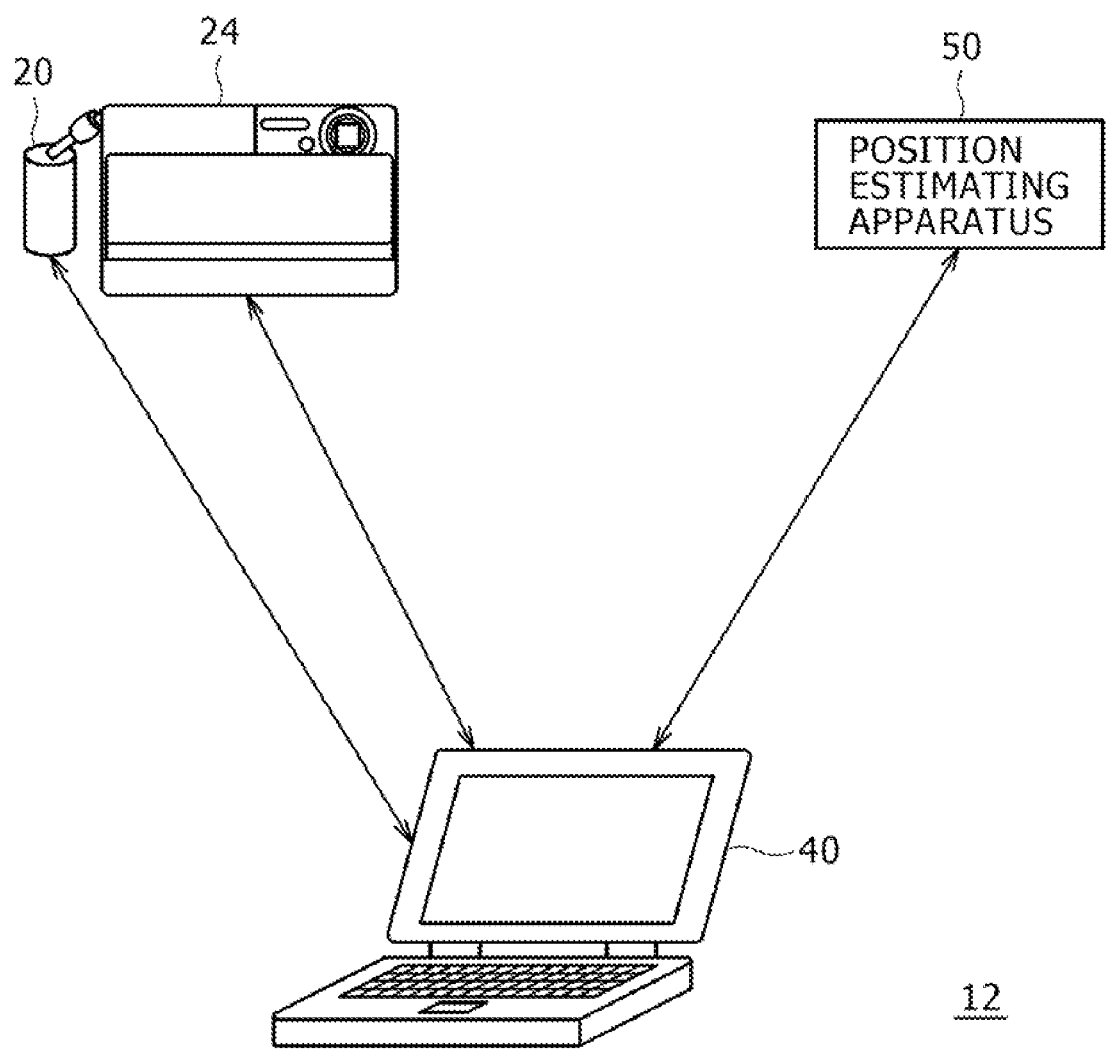
FIG. 2 is an illustrative diagram showing the configuration of a position information processing system during data processing according to the first embodiment.

FIG. 2 is an illustrative diagram showing the configuration of a position information processing system of the first embodiment. The position information processing system 12 includes the receiving apparatus 20, the imaging apparatus 24, a PC 40 and a position estimating apparatus 50.

PC 40 receives a history of the signal intensity information from the receiving apparatus 20, and transmits the history of the signal intensity information to the position estimating apparatus 50. PC acquires position information of the receiving apparatus 20 at each measurement time of the signal intensity estimated by using the history of the signal intensity information, from the position estimating apparatus 50.

PC 40 receives from the imaging apparatus 24 photographic information correlating the photographs taken with the imaging apparatus 24 and record times when the photographs were taken. The record times are compared with the measurement times correlated with the position information acquired from the position estimating apparatus 50, and the position information acquired from the position estimating apparatus 50 is correlated with the photographs taken with the imaging apparatus 24.

The position estimating apparatus 50 stores beforehand base station information representative of the position information indicating an installation position of the base station 30 correlated with the base station ID, and has a function of estimating the position information of the receiving apparatus 20 at a specific time, for example, by the triangular techniques, based on the signal intensity information received from PC 40 and the base station information. The position estimating apparatus 50 transmits the estimated position information at the specific time correlated with the specific time to PC 40. The position estimating apparatus 50 responds to a position presumption request not only from PC 40 but also from a plurality of other wireless terminals.

According to the position information processing systems 10 and 12 of the embodiment, a photograph taken with the imaging apparatus 24 can be correlated at a later time with the position information indicating a position where the imaging apparatus 24 took the photograph. If the base station 30 and receiving apparatus 20 is in conformity with WiFi, even if the receiving apparatus 20 is in the interior of a house, an underground room or the like where a signal from a satellite does not reach when the imaging apparatus 24 takes a photograph, the position information of the receiving apparatus 20 is calculated at a later time, and the calculated position information can be correlated with the photograph taken with the imaging apparatus 24.

A synopsis of the position information processing systems 10 and 12 of the embodiment has been described above. In the following, description will be made of the detailed structures of the receiving apparatus 20, imaging apparatus 24, PC 40 and position estimating apparatus 50 contained in the position information processing systems 10 and 12 of the embodiment.

FIG. 3 is a functional block diagram showing the structure of the receiving apparatus 20 of the embodiment. The receiving apparatus 20 has a communication unit 208, a measuring unit 212, a setting unit 216, a data processing unit 220 and a history information storage unit 224.

The communication unit 208 is an interface with the base stations 30 to 32 and PC 40 in the nearby area, and has a function as a receiver and a transmitter. More specifically, the communication unit 208 receives a signal (e.g., a beacon signal) transmitted from the base stations 30 to 32 in the nearby area. The communication unit 208 transmits a history of signal intensity information to be described later, to PC 40. The communication unit 208 may be a wireless LAN compatible communication apparatus, a GSM compatible communication apparatus or a Bluetooth compatible communication apparatus.

The measuring unit 212 measures a signal intensity of a signal received by the communication unit 208 from the base stations 30 to 32 and the like in the nearby area. The measuring unit 212 measures a signal intensity at a period set, for example, by the setting unit 216.

The setting unit 216 has a function of performing various settings regarding the operation of the receiving apparatus 20. For example, based on a user operation, the setting unit 216 sets a period at which the measuring unit 212 measures a signal intensity. This period may be one minute, ten minutes or one hour. Based on a user operation, the setting unit 216 may set so that the measuring unit 212 measures a signal intensity at a predetermined time. For example, the setting unit 216 may set as the measurement times, 2006-10-26 10:00:00, 2006-10-26 10:45:00 and 2006-10-26 11:00:00.

By making the measuring unit 212 measure a signal intensity at a predetermined time interval or a predetermined time, the receiving apparatus 20 is set to a sleep state while the measuring unit 212 does not measure a signal intensity. The sleep state may be a state that a portion or the whole of the receiving apparatus 20 sleeps. It is therefore possible to improve a continuity time of a power source of the receiving apparatus 20. Since a GPS receiver takes a time for synchronous capture, it is realistic to continue synchronous holding in order to acquire position information at a predetermined time interval. It is therefore difficult to make the GPS receiver enter the sleep state while a signal intensity is not measured, so that consumption of the power source of the GPS receiver becomes severe. For example, using a wireless LAN compatible apparatus as the receiving apparatus 20 is therefore effective also from the viewpoint of continuity of the power source.

The setting unit 216 may set a measuring period dynamically based on a charge state of the power source of the receiving apparatus 20. For example, the setting unit 216 may set a longer measuring period if a charge level of the power source of the receiving apparatus 20 is low, or may set a shorter measuring period if a charge level of the power source of the receiving apparatus 20 is high.

The data processing unit 220 has a function of recording signal intensity information in the history information storage unit 224 and reading a history of signal intensity information from the history information storage unit 224. More specifically, the data processing unit 220 records a signal intensity of a signal measured with the measuring unit 212, a base station ID of a base station as a transmission source of the signal and a time when the measuring unit 212 measured the signal intensity respectively correlated with each other in the history information storage unit 224 as signal intensity information. The contents of the signal intensity information are not limited to this example, but the contents may include a time when the communication unit 208 received the signal or a distance between the receiving apparatus 20 and base station 30 estimated from the signal intensity.

The history information storage unit 224 functions as a storage or a history storage medium for storing the signal intensity information constituted of a signal intensity of a signal measured with the measuring unit 212, a base station ID of a base station as a transmission source of the signal and a time when the measuring unit 212 measured the signal intensity respectively correlated with each other. With reference to FIGS. 4A to 4C, description will be made on an example of signal intensity information to be stored in the history information storage unit 224.

FIGS. 4A to 4C are illustrative diagrams showing an example of signal intensity information stored in the history information storage unit 224. As shown in FIGS. 4A to 4C, the history information storage unit 224 stores, as history information, signal intensity information at a plurality of times correlated with measurement times when the signal intensity information was measured. More specifically, FIG. 4A shows the signal intensity information at 2006-08-29 13:00:00, FIG. 4B shows the signal intensity information at 2006-08-29 13:01:00, and FIG. 4C shows the signal intensity information at 2006-08-29 13:02:00.

Namely, in the example shown in FIG. 4A, a signal intensity of a signal transmitted from a base station having a base station ID of "30" is "−90 Dbm" at the receiving apparatus 20 at 2006-08-29 13:00:00. In the following description, it is assumed that the base station ID is the same as the symbol affixed to each base station. At 2006-08-29 13:00:00, a signal intensity of a signal transmitted from the base station 31 is "−70 Dbm", a signal intensity of a signal transmitted from the base station 32 is "−80 Dbm", and a signal intensity of a signal transmitted from a base station 33 is "−75 Dbm". Similarly, FIG. 4B shows a signal intensity at 2006-08-29 13:01:00 for each base station, and FIG. 4C shows a signal intensity at 2006-08-29 13:02:00 for each base station.

The history information storage unit 224 may be a storage medium including: a non-volatile memory such as an electrically erasable programmable read-only memory (EEPROM) and an erasable programmable read-only memory (EPRPM); a magnetic disk such as a hard disk and a disk type magnetic medium; an optical disc such as compact disk recordable (CD-R)/rewritable (RW), digital versatile disk recordable (DVD-R)//RW/+R/+RW/random access memory (RAM) and Blu-Ray Disc (registered trademark) (DB) -R/BD-RE; and a magneto optical (MO) disc.

The structure of the receiving apparatus 20 has been described above. Next, the structure of the imaging apparatus 24 will be described with reference to FIGS. 5 and 6.

Figure 5:
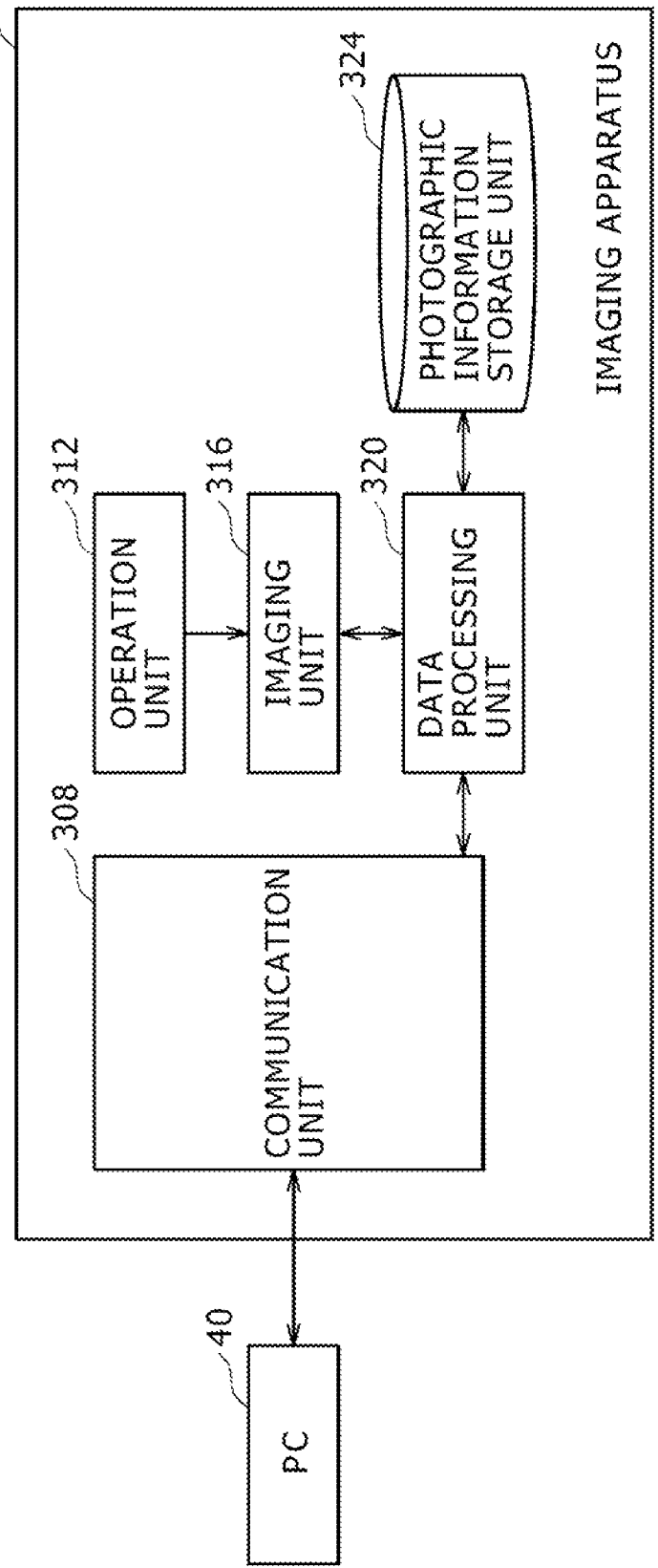
FIG. 5 is a functional block diagram showing the structure of an imaging apparatus.

FIG. 5 is a functional block diagram showing the structure of the imaging apparatus 24. The imaging apparatus 24 has a communication unit 308, an operation unit 312, an imaging unit 316, a data processing unit 320 and a photographic information storage unit 324.

The communication unit 308 is an interface with PC 40, and functions as a transmitter and a receiver. For example, in response to a request from PC 40, the communication unit 308 transmits photographic information to be described later to PC. The communication unit 308 may be a wireless LAN compatible communication apparatus, a GSM compatible communication apparatus or a Bluetooth compatible communication apparatus.

The operation unit 312 is an interface to be used by a user of the imaging apparatus 24 to instruct the imaging apparatus 24 to take a photograph. The operation unit 312 may be an operation member to be operated by a user, such as a touch panel, a button, a switch and a lever. The operation unit 312 may have a structure which generates a photographing instruction signal upon a user operation and outputs this signal to the imaging unit 316.

The imaging unit 316 picks up an image in the area near the imaging apparatus 24 at a specific time, and converts the image into photographic information expressed by electric signals. The photographic information may be digital or analog.

The data processing unit 320 has a function of recording photographic information in the photographic information storage unit 324 and reading photographic information from the photographic information storage unit 324. More specifically, the data processing unit 320 stores the photographic information taken with the imaging unit 316 correlated with a specific time when the imaging unit 316 acquired an image, in the photographic information storage unit 324. The data processing unit 320 stores the photographic information taken with the imaging unit 316 correlated with a time when the photographic information is recorded in the photographic information storage unit 324, in the photographic information storage unit 324. The time correlated with photographic information is called also a record time in this specification. In response to a request from PC 40, the data processing unit 320 reads photographic information recorded in the photographic information storage unit 324.

The photographic information storage unit 324 functions as an information storage medium for storing the photographic information based on an image in the nearby area taken with the imaging unit 316 at the specific time correlated with the specific time. Examples of photographic information stored in the photographic information storage unit 324 will be described with reference to FIG. 6.

FIG. 6 shows examples of photographic information stored in the photographic information storage unit 324. As shown in FIG. 6, the photographic information storage unit 324 stores each photographic information correlated to a record time of the photograph.

For example, photographic information 340 representative of a rice omelet is correlated with a record time of 2006-08-30 14:20:11 indicating that the photographic information 340 was recorded at 2006-08-30 14:20:11. Similarly, FIG. 6 shows that photographic information 350 was recorded at 2006-08-30 13:30:01 and photographic information 360 was recorded at 2006-08-28 17:56:25.

Similar to the history information storage unit 224 of the receiving apparatus 20, the photographic information storage unit 324 may be a storage medium including: a non-volatile memory such as EEPROM and EPRPM; a magnetic disk such as a hard disk and a disk type magnetic medium; an optical disc such as CD-R/RW, DVD-R/RW/+R/+RW/RAM and BD (registered trademark) -R/BD-RE; and an MO disc.

Since the imaging apparatus 24 of the embodiment is not required to have a special structure other than recording photographic information correlated with a record time, an already existing camera may be used.

The structure of the imaging apparatus 24 has been described above. In succession, the structures of PC 40 and the position estimating apparatus 50 will be described with reference to FIGS. 7 to 12.

Figure 7:
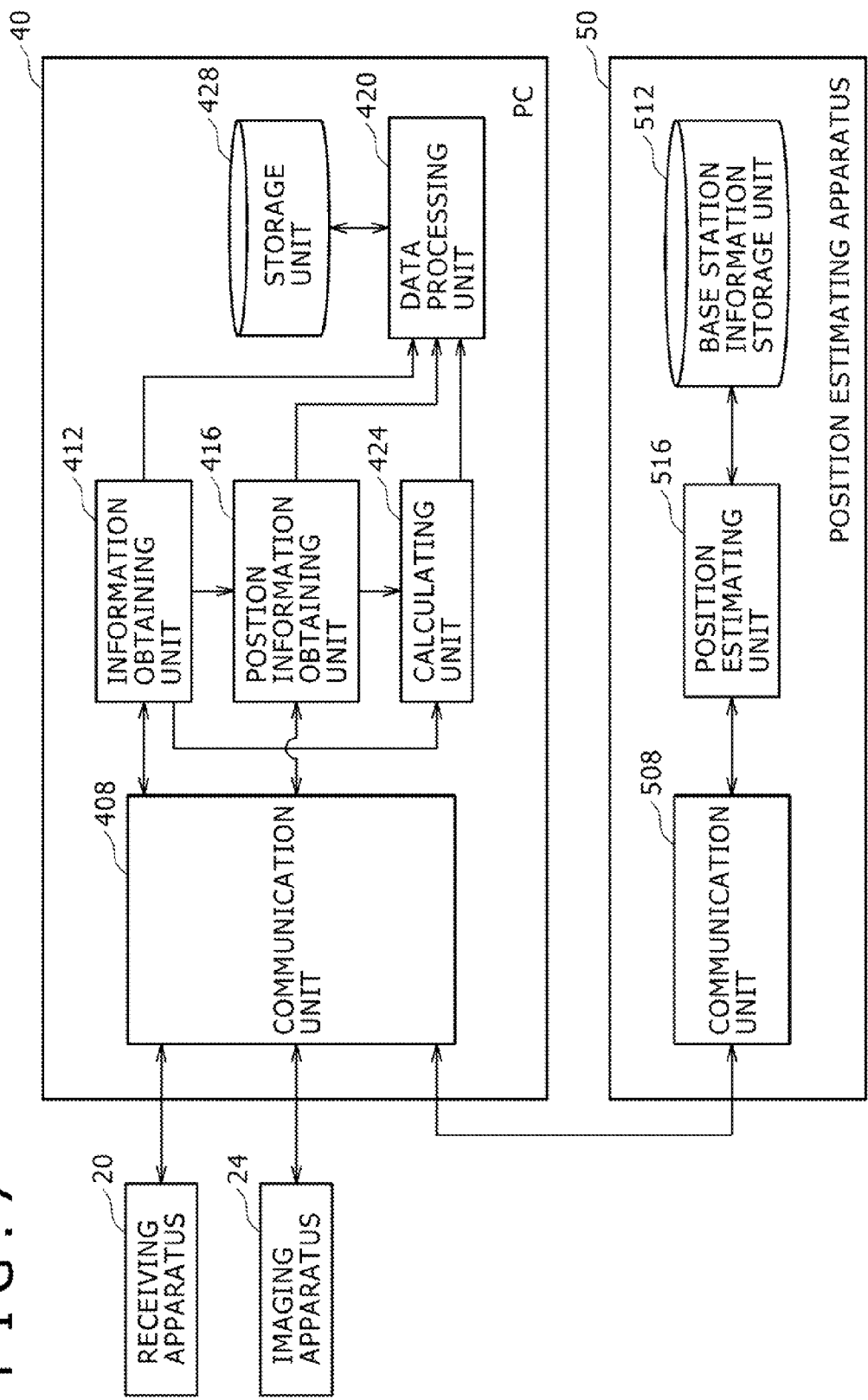
FIG. 7 is a functional block diagram showing the structure of a PC of the first embodiment.

FIG. 7 is a functional block diagram showing the structure of PC 40. PC 40 has a communication unit 408, an information obtaining unit 412, a position information obtaining unit 416, a data processing unit 420, a calculating unit 424 and a storage unit 428. The position estimating apparatus 50 has a communication unit 508, a base station information storage unit 512 and a position estimating unit 516.

The communication unit 408 is an interface with the receiving apparatus 20, imaging apparatus 24 and position estimating apparatus 508, and has a function as a receiver and a transmitted. More specifically, the communication unit 408 receives a history of signal intensity information from the receiving apparatus 20, and photographic information correlated to a record time from the imaging apparatus 24, transmits the signal intensity information to the position estimating apparatus 50, and receives position information from the position estimating apparatus 50.

The information obtaining unit 412 has a function of a signal intensity information receiving unit which issues a transmission for a history of signal intensity information to the receiving apparatus 20 and acquires the history of signal intensity information from the receiving apparatus 20 via the communication unit 408. The information obtaining unit 412 has a function of a record time receiving unit which issues a transmission request for photographic information correlated to a record time to the imaging apparatus 24, and acquires the photographic information and record time from the imaging apparatus 24. The information acquired by the information obtaining unit 412 in this manner may be recorded in the storage unit 428 by using the data processing unit 420. An event upon which the information obtaining unit 412 issues the transmission request to the receiving apparatus 20 or imaging apparatus 24 may be a user operation or a connection detection of the receiving apparatus 20 or imaging apparatus 24.

The position information obtaining unit 416 issues a position estimating request to the position estimating apparatus 50 to acquire position information from the position estimating apparatus 50. More specifically, the position information obtaining unit 416 transmits the position estimating request and the history of signal intensity information acquired by the information obtaining unit 412 to the position estimating apparatus 50 to thereby receive the position information at each measurement time estimated by the position estimating apparatus 50 based on the history of signal intensity information.

The position information obtaining unit 416 outputs the position information and measurement time received from the position estimating apparatus 50 to the data processing unit 420.

The position information obtaining unit 416 may extract a measurement time nearest to the record time correlated to the photographic information acquired by the information obtaining unit 412, from the measurement times contained in the signal intensity information acquired by the information obtaining unit 412, and may transmit only the signal intensity information correlated to the extracted measurement time together with the position estimating request, to the position estimating apparatus.

Description will be directed toward the position estimating apparatus 50 side. The communication unit 508 is an interface with PC 40. More specifically, the communication unit receives the history of signal intensity information from PC 40, and transmits position information to PC 40. The communication unit 508 transmits/receives information relative to not only one PC 40 but also two or more information processing apparatus.

The base station information storage unit 512 stores, as the base station information, the base station ID of a base station performing wireless communications with the receiving apparatus 20 correlated to the position information indicating an install position of the base station. An example of the base station information stored in the base station information storage unit 512 will be described with reference to FIG. 8.

FIG. 8 is an illustrative diagram showing an example of the base station information stored in the base station information storage unit 512. As shown in FIG. 8, the base station information storage unit 512 stores, as already known base station information, the base station ID correlated with the longitude and latitude as position information of the base station installed. More specifically, the base station 30 having the base station ID "30" is registered in the base station information storage unit 512 as installed at a longitude (east longitude) "135.001" and a latitude (north latitude) "35.49".

Similarly, the base station 31 is registered in the base station information storage unit 512 as installed at a longitude "135.002" and a latitude "35.41", the base station 32 is registered in the base station information storage unit 512 as installed at a longitude "135.003" and a latitude "35.50", and the base station 34 is registered in the base station information storage unit 512 as installed at a longitude "135.002" and a latitude "35.42".

The format of position information to be stored in the base station information storage unit 512 is not limited to the format using longitude and latitude, but may be the format using x, y coordinates, the format using polar coordinates or the format using vector.

Similar to the history information storage unit 224, the base station information storage unit 512 may be a storage medium including: a non-volatile memory such as EEPROM and EPRPM; a magnetic disk such as a hard disk and a disk type magnetic medium; an optical disc such as CD-R/RW, DVD-R/RW/+R/+RW/RAM and BD (registered trademark) -R/BD-RE; and an MO disc.

The position estimating unit 516 estimates position information of the receiving apparatus 20 at each measurement time of the signal intensity from the following numerical formula (1), by using the history of signal intensity information received from PC 40 and the base station information registered in the base station information storage unit 512.

$$O = \frac{1}{W}\sum_{i}(Wi \cdot Ai) \quad (1)$$

$$Wi = \frac{1}{distS(O, Ai)} \quad (2)$$

$$W = \sum_{i} Wi \quad (3)$$

In the formula (1), Ai represents position information of an i-th base station registered in the base station information storage unit 512. If the base station information is represented by the longitude and latitude as shown in FIG. 8, the formula (1) is applied to each longitude and latitude. As shown in a formula (2), Wi is a weight coefficient obtained basing upon distS (O, Ai) indicating a distance between the receiving apparatus 20 estimated from the signal intensity and the i-th base station. As shown in a formula (3), W is a total sum of weight coefficients.

As seen from the formula (1), position information of a base station having a short distS (O, Ai) is reflected greatly upon the position O of the receiving apparatus 20 estimated at each measurement time. Position information of the base station having a long distS (O, Ai) has less influence upon the position O of the receiving apparatus 20 estimated.

By using the formula (1), the position estimating unit 516 rationally estimates the position O of the receiving apparatus 20 at each measurement time of the signal intensity. The position estimating unit 516 transmits the position information indicating the position O estimated by the position estimating unit and correlated to the measurement time to PC 40 via the communication unit 508.

Namely, the position estimating unit 516 returns the signal intensity information received from PC 40 and converted into the position information shown in FIG. 9.

FIG. 9 is an illustrative diagram showing an example of the position information obtained by the position estimating unit 516. As shown in FIG. 9, the position information including the longitude, latitude, an address and the like obtained by the position estimating unit 516 is correlated to the measurement time of the signal intensity at the receiving apparatus 20. FIG. 9 indicates that, for example, it is estimated that the receiving apparatus 20 exists at the longitude 135.002 and latitude 35.46 and at an address of AB prefecture, C ward, 5-chome at 2006-08-29 13:00:00.

A position estimating method for the receiving apparatus 20 is not limited to the method using the formula (1), but, for example, the position of the base station which transmitted a signal received at the receiving apparatus 20 at the highest signal intensity, may be estimated as the position of the receiving apparatus 20. Alternatively, the center position of base stations which transmitted signals received at the receiving apparatus 20 at a level equal to or higher than a predetermined threshold value.

The position estimating apparatus 50 having the position estimating unit 516 described above estimates the position of the receiving apparatus 20, for example, based on a signal intensity of a signal received at the receiving apparatus 20 compatible with wireless LAN from the wireless LAN base station. There is a high possibility that the wireless LAN base station is installed at a variety of positions including an underground room, the interior of a house and the like. If the receiving apparatus 20 is compatible with wireless LAN, the position estimating apparatus 50 estimates the position of the receiving apparatus 20 at each measurement time the receiving apparatus 20 measures the signal intensity, irrespective of whether the receiving apparatus 20 exists in an underground room, or the interior of a house.

Returning back to the description of the structure of the PC 40 side, the data processing unit 420 receives the position information correlated to the measurement time from the position information obtaining unit 416, and the photographic information correlated to the record time acquired by the information obtaining unit 412 from the imaging apparatus 24. The data processing unit 420 stores the photographic information acquired by the information obtaining unit 412 correlated to the position information acquired by the position information obtaining unit 416, in the storage unit 428.

More in detail, the data processing unit 420 extracts the measurement time nearest to the record time correlated to the photographic information, and correlates the position information correlated to the extracted measurement time, to the photographic information. In this arrangement, if the receiving apparatus 20 measures intermittently the signal intensity, the position information of the receiving apparatus 20 at a photograph record time is expressed in a simple manner even if information on the signal intensity measured at the same time when the photograph was taken is not contained in the history of signal intensity information. The data processing unit 420 may correlate the position information by writing the position information in a position information field for writing the position information as meta data of photographic information. The data processing unit 420 may correlate the position information by writing the position information as meta data on a photograph sharing site.

The storage unit 428 stored the photographic information and position information correlated by the data processing unit 420. The photographic information and position information stored in the storage unit 428 will be described with reference to FIGS. 10 and 11.

Figure 10:
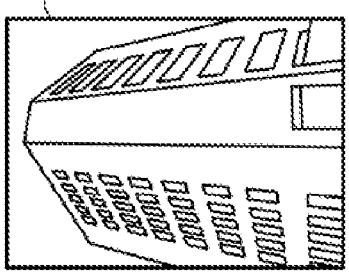
FIG. 10 is an illustrative diagram showing an example of photographic information and position information correlated by a data processing unit and stored in a storage unit.
Figure 11:
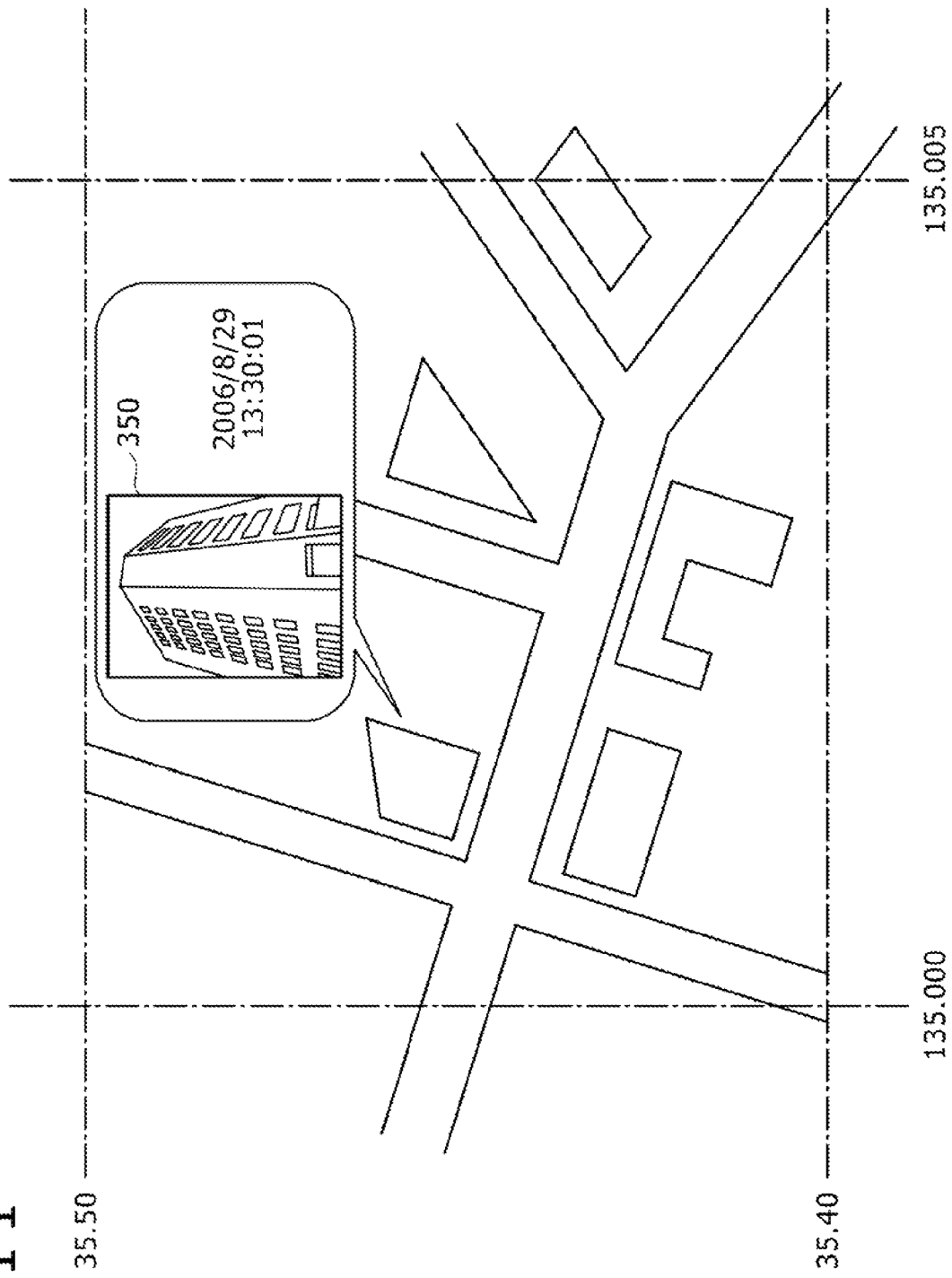
FIG. 11 is an illustrative diagram showing an example of a map displayed on a display unit basing upon photographic information and position information.

FIG. 10 is an illustrative diagram showing an example of the photographic information and position information correlated by the data processing unit 420 and stored in the storage unit 428. FIG. 11 is an illustrative diagram showing an example of a map displayed on a display unit based on the photographic information and position information. As shown in FIG. 10, the storage unit 428 stores the photographic information, a record time of the photograph, and a record location of the photograph. More specifically, FIG. 10 indicates that photographic information 35 was recorded at 2006-08-29 13:30:01" and at the location at a longitude "135.002 and latitude "35.46". This position information on the receiving apparatus 20 is at 2006-08-29 13:30:00 which is a measurement time nearest to 2006-08-29 13:30:01 estimated by the position estimating apparatus 50.

The photographic information correlated to the position information may be displayed on a map displayed on a display unit (not shown), as shown in FIG. 11. More in detail, the photographic information together with the record time is displayed on the map at a photographic information record location at the latitude "135.002" and longitude "35.46".

Similar to the history information storage unit 224, the storage unit 428 may be a storage medium including: a non-volatile memory such as EEPROM and EPRPM; a magnetic disk such as a hard disk and a disk type magnetic medium; an optical disc such as CD-R/RW, DVD-R/RW/+R/+RW/RAM and BD (registered trademark) -R/BD-RE; and an MO disc.

As described above, according to the embodiment, the position information correlated to the measurement time nearest to the record time of the photographic information can be correlated to the photographic information in a simple manner. However, if a measuring period of the signal intensity to be measured at the receiving apparatus 20 is set relatively long, e.g., 30 minutes or 1 hour, there is a high possibility that an error becomes large between the position information correlated to the photographic information and the position information of the receiving apparatus 20 at the time when the photographic information is actually recorded.

In this embodiment, therefore, in order to correct this error, the calculating unit 424 is provided in PC 40 so that the data processing unit 420 may correlate more reliable position information to the photographic information. The operation of the calculating unit 424 will be described with reference to FIG. 12.

Figure 12:
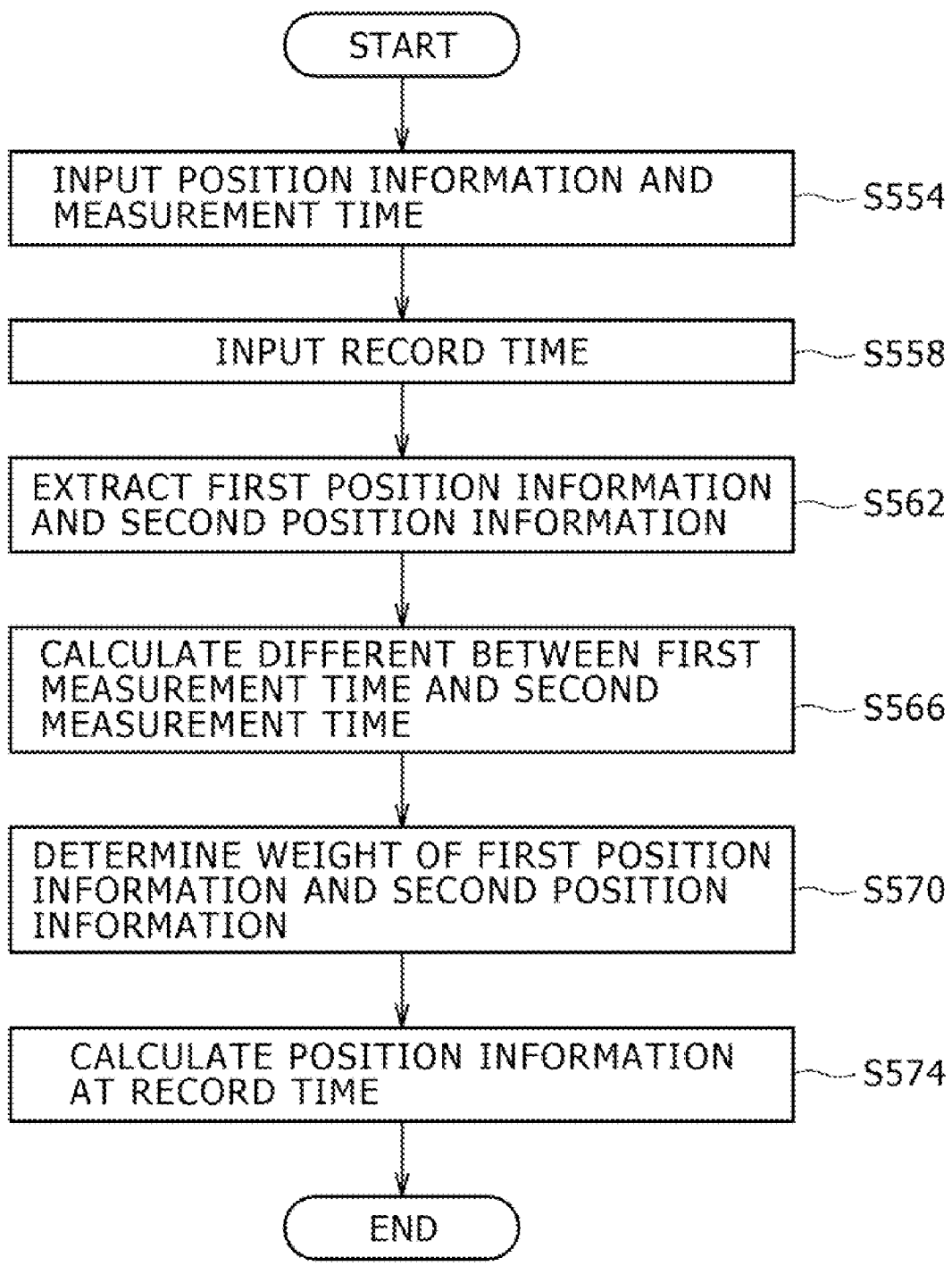
FIG. 12 is a flow chart illustrating an operation sequence of a calculation unit.

FIG. 12 is a flow chart illustrating the operation flow of the calculating unit 424. First, the calculating unit 424 receives the correlated position information and measurement time from the position information obtaining unit 416 (S554). The calculating unit receives a record time (specific time) when the imaging apparatus 24 recorded photographic information from the information obtaining unit 412 (S558). The calculating unit 424 extracts first position information correlated to a first measurement time nearest to the record time and before the record time, from the information input from the position information obtaining unit 416 (S562). The calculating unit 424 also extracts second position information correlated to a second measurement time nearest to the record time and after the record time, from the information input from the position information obtaining unit 416 (S562).

Next, the calculating unit 424 calculates a first difference between the first measurement time and record time, and a second difference between the second measurement time and record time (S566). The calculating unit 424 calculates a proportional coefficient of the first difference relative to the second difference to use this proportional coefficient as a weight coefficient of the second position information (S570). A weight coefficient is not added to the first position information (or a weight coefficient "1" is added). Next, based on the weight coefficient added to the position information at S570, the calculating unit 424 calculates third position information (S574). More specifically, the calculating unit 424 divides the distance between the first position information and second position information based on the weight coefficient, and uses the divided position as the third position information. The data processing unit 420 correlates the third position information calculated at S574 to the photographic information.

According to the operation of the calculating unit 424, by making the receiving apparatus 20 intermittently measure the signal intensity, more reliable position information of the receiving apparatus at the time when the photographic information is recorded, even if the signal intensity information at the same measurement time as the record time of the photographic information at the imaging apparatus 24 is not contained in the history of signal intensity information.

PC 40 described above is shown as only an example of the position information processing apparatus. The position information processing apparatus may be an information processing apparatus including a home video processing apparatus (such as a DVD recorder and a video deck), a mobile phone, a PHS, a portable music reproducing apparatus, a portable video processing apparatus, a personal digital assistant (PDA), a home game apparatus, a portable game apparatus, and a home electronic apparatus.

A computer program may be formed which makes hardware of a CPU, a ROM, a RAM and the like in the receiving apparatus 20, imaging apparatus 24, PC 40 and position estimating apparatus 50 provide the equivalent functions of each structure of the receiving apparatus 20, imaging apparatus 24, PC 40 and position estimating apparatus 50.

The detailed configurations of the position information processing systems 10 and 12 of the embodiment have been described above. Next, with reference to FIG. 13, description will be made on the position information processing method for the position information processing systems 10 and 12 of the embodiment.

Figure 13:
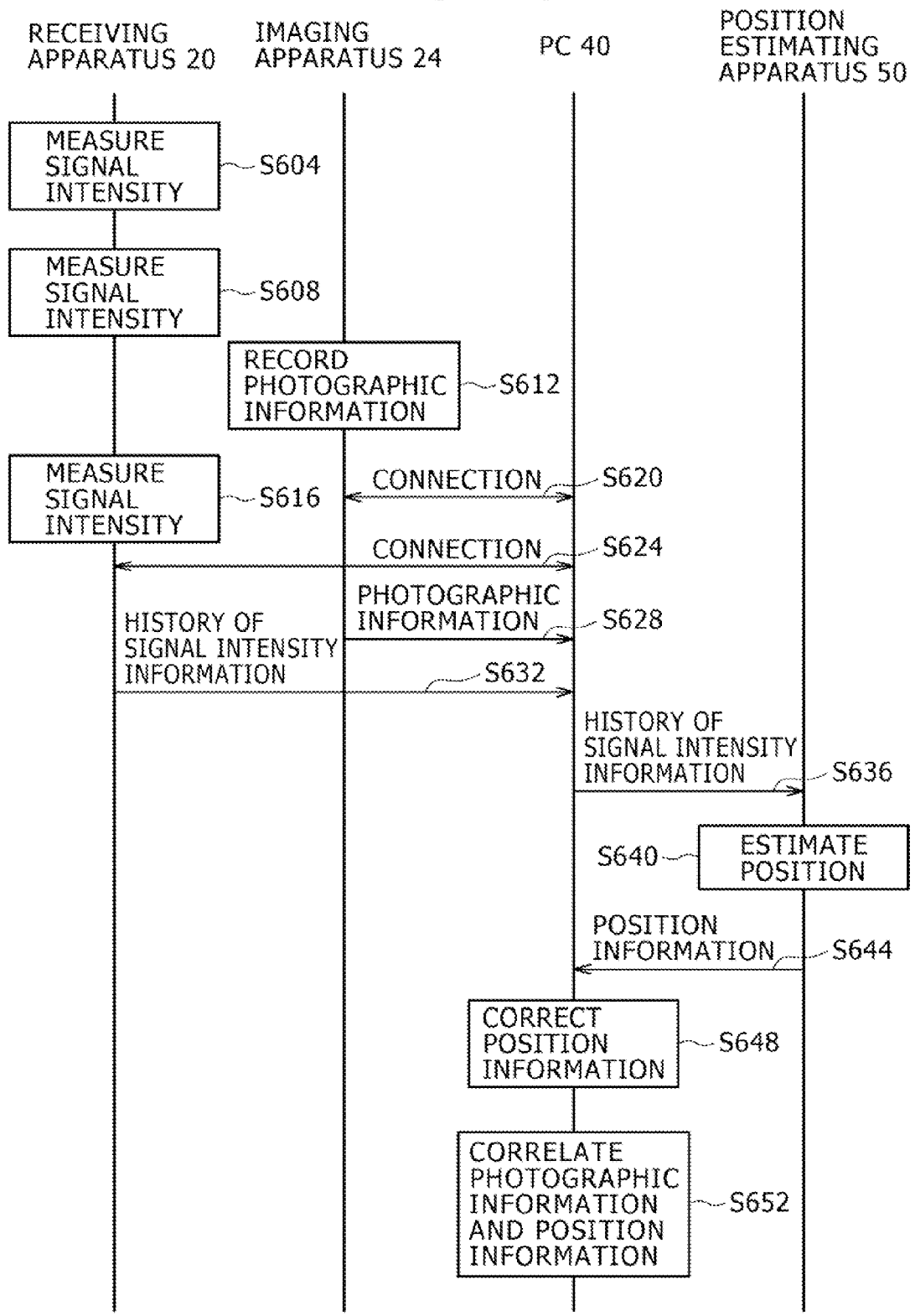
FIG. 13 is a sequential diagram illustrating an operation flow of the position information processing system of the embodiment.

FIG. 13 is a sequential diagram illustrating the operation flow of the position information processing systems 10 and 12 of the embodiment. First, the receiving apparatus 20 measures a signal intensity at a predetermined time interval or a predetermined time, and stores a history of signal intensity information (S604, S608, S616). Next, the imaging apparatus 24 records photographic information correlated to a record time (S612). Next, the imaging apparatus 24 is connected to PC 40 (S620). The receiving apparatus 20 is connected to PC 40 (S624).

The imaging apparatus 24 transmits the correlated photographic information and record time to PC 40 (S628). The receiving apparatus 20 transits the history of signal intensity information to PC 40 (S632).

PC 40 transmits the position estimating request and the history of signal intensity information to the position estimating apparatus 50 (S636). Based on the history of signal intensity information received from PC 40, the position estimating apparatus 50 estimates position information of the receiving apparatus 20 at one or more times (S640). Thereafter, the position estimating apparatus 50 transmits the estimated position information to PC 40 (S644).

Next, PC 40 corrects if necessary the position information received from the position estimating apparatus 50 (S648). Namely, the calculating unit 424 is made to calculate the third position information. PC 40 correlates the photographic information to the position information received from the position estimating apparatus 50 or the third position information (S652).

In the manner described above, according to the position information processing systems 10 and 12 of the first embodiment of the present invention, a photograph taken at a later time with the imaging apparatus 24 may be correlated to the position information representative of the position where the imaging apparatus 24 took the photograph. If the base station 30 and receiving apparatus 20 are compatible with WiFi, the position information of the receiving apparatus 20 is calculated at a later time and correlated to the photograph taken with the imaging apparatus 24, even if the receiving apparatus 20 existed in an underground room or the interior of a house where radio waves from a satellite cannot arrive, when the imaging apparatus 24 took the photograph.

Further, according to the position information processing systems 10 and 12 of the first embodiment of the present invention, the measuring unit 212 of the receiving apparatus 20 measures a signal intensity at a predetermined time interval or a predetermined time and the receiving apparatus 20 is set to the sleep state while the measuring unit 212 does not measure the signal intensity. It is therefore possible to improve the retention time of the power source of the receiving apparatus 20.

Furthermore, according to the position information processing systems 10 and 12 of the first embodiment of the present invention, by making the receiving apparatus 20 intermittently measure a signal intensity, position information of the receiving apparatus 20 at a record time of a photograph is expressed in a simple manner even if the signal intensity information measured at the same time as the photograph record time is not contained in the list of signal intensity information.

Furthermore, according to the position information processing systems 10 and 12 of the first embodiment of the present invention, the calculating unit 424 is provided in PC 40. It is therefore possible to calculate more reliable position information of the receiving apparatus 20 at the record time of photographic information, even if the signal intensity information at the same measurement time as the record time of the photographic information at the imaging apparatus 24 is not contained in the history of signal intensity information.

Although the imaging apparatus 24 has been described as the information recording apparatus, the information recording apparatus is not limited to the imaging apparatus 24, but any apparatus may be used if the apparatus records information in an arbitrary position environment. For example, if a voice recorder is used as the information recording apparatus, PC 40 correlates voices recorded with the voice recorder to the location where the voice recorder recorded voices. With this arrangement, it is possible to identify the location where voices were recorded with the voice recorder, e.g., a building, a conference room, a school room, or a meeting site.

If the information recording apparatus is a storage medium, PC 40 may correlate the content recorded in the storage medium to the position where the content was recorded in the storage medium. With this arrangement, it is possible to identify the position where the content was recorded in the storage medium. For example, if the content was recorded in an A's house, it is possible to identify that the content was recorded in the A's house to that it can estimate that the content was acquired from A and the same content is possessed also by A.

As described above, since PC 40 correlates information recorded with the information recording apparatus to the position information, the information can be made to have a hierarchical structure based on the information recording position.

Second Embodiment

Next, a second embodiment of the present invention will be described. In the position information processing systems 10 and 12 of the first embodiment, the receiving apparatus 20 is provided separately from the imaging apparatus 24. If a user holds in hands the receiving apparatus 20 and imaging apparatus 24 at the same time, PC 40 correlates the photographic information and position information.

However, in the position information processing systems 10 and 12 of the first embodiment, the receiving apparatus 20 is provided separately from the imaging apparatus 24. There occurs some cases in which a user forget to hold in hand one of the apparatus. It is also considered that a user feels cumbersome to hold in hands a plurality of apparatus. Further, the receiving apparatus 20 of the position information processing systems 10 and 12 of the first embodiment measures a signal intensity asynchronously with recording photographic information at the imaging apparatus 24. There arises therefore a possibility that signal intensity information at the same time as the record time of photographic information does not exist, and that a number of signal intensity information pieces not used exist in the history of signal intensity information acquired by the receiving apparatus 20.

This issue is solved by position information processing systems 60 and 62 of the second embodiment of the present invention, in which a receiving apparatus 70 is provided with a function of an information recording apparatus. With reference to FIGS. 14 to 17, description will be made on the position information processing systems 60 and 62 of the second embodiment.

Figure 14:
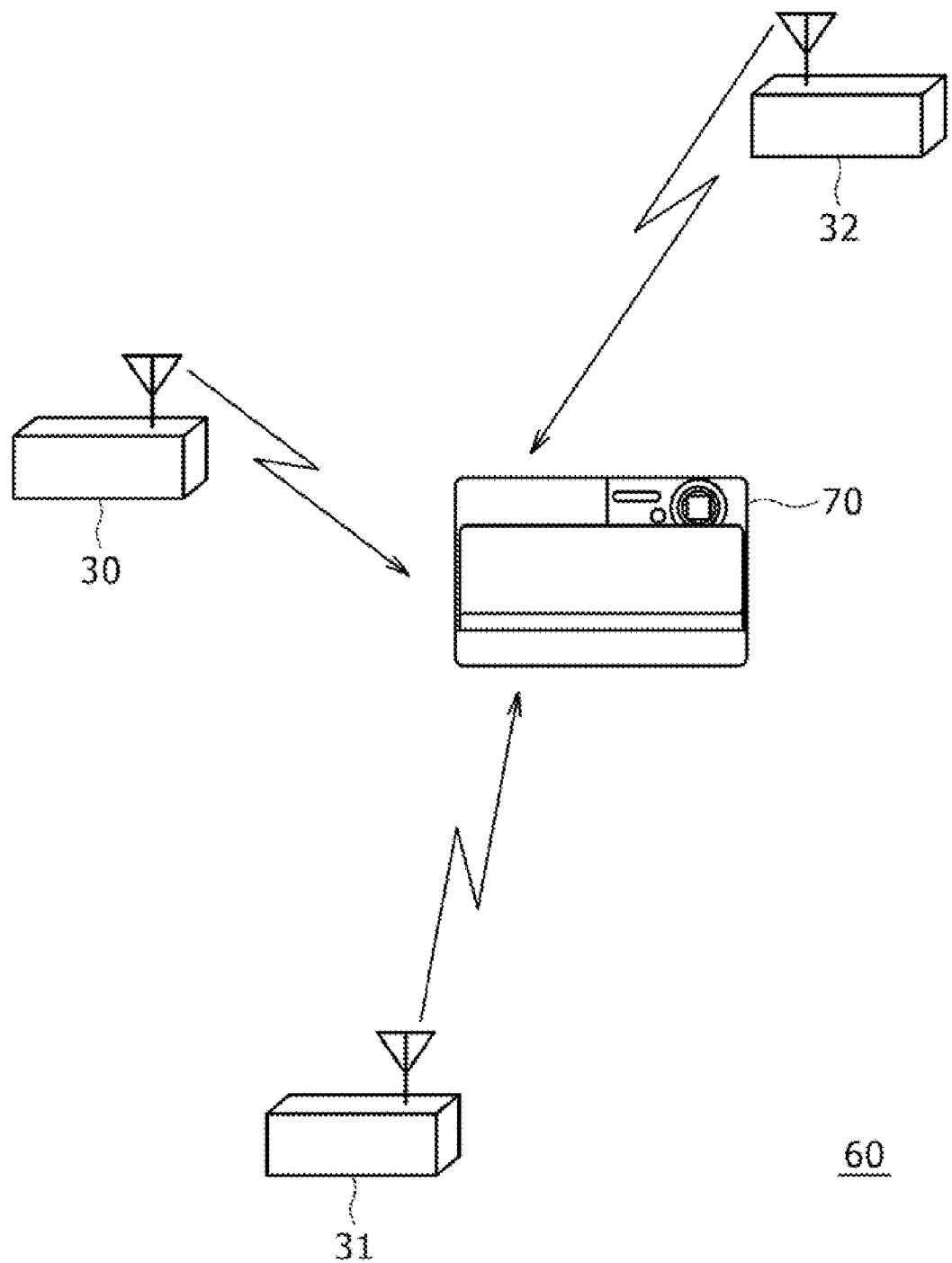
FIG. 14 is an illustrative diagram showing the configuration of a position information processing system during data collection according to a second embodiment of the present invention.

FIG. 14 is an illustrative diagram showing the configuration of the position information processing system 60 during data collection according to the second embodiment. The position information processing system 60 during data collection according to the second embodiment includes base stations 30, 31 and 32 and the receiving apparatus 70.

The receiving apparatus 70 is provided with the structures of the receiving apparatus 20 and imaging apparatus 24 described in the first embodiment. Namely, the receiving apparatus 70 is a communication apparatus integrating the receiving apparatus 20 and imaging apparatus 24 described in the first embodiment. More in detail, the receiving apparatus 70 has both the function of measuring a signal intensity of a signal transmitted from the base station 30 and a function of taking an image matching the position environment of the receiving apparatus 70 and recording the image as photographic information.

Figure 15:
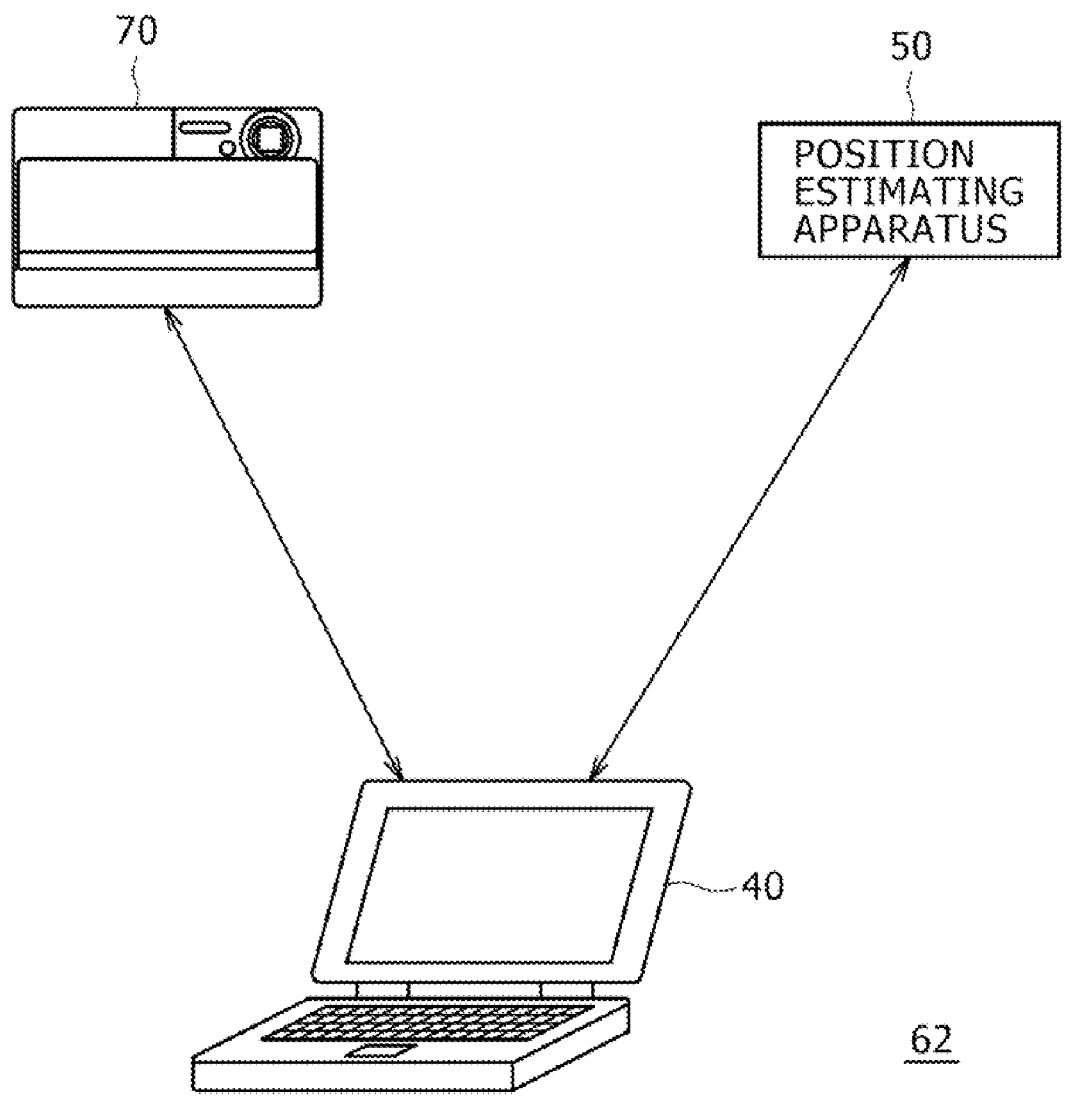
FIG. 15 is an illustrative diagram showing the configuration of a position information processing system during data processing according to the second embodiment.

FIG. 15 is an illustrative diagram showing the configuration of the position information processing system 62 during data processing according to the second embodiment. The position information processing system 62 during data collection according to the second embodiment includes a PC 40, a position estimating apparatus 50 and the receiving apparatus 70.

With this arrangement, by connecting PC 40 only to the receiving apparatus 70, it is possible to acquire signal intensity information and photographic information from the receiving apparatus 70. The structures of PC 40 and position estimating apparatus 50 have many duplicated portions of the contents described in the first embodiment, and the description thereof is omitted.

FIG. 16 is a functional block diagram showing the structure of the receiving apparatus 70 of this embodiment. The receiving apparatus 70 has a communication unit 208, a measuring unit 212, a data processing unit 220, an operation unit 312, an imaging unit 316 and an information storage unit 724.

The communication unit 208 is an interface for receiving a signal transmitted from the base station 30 or the like and transmitting signal intensity information and photographic information to PC 40.

The operation unit 312 is an interface for a user of the receiving apparatus 70 to instruct the receiving apparatus 70 to take a photograph. The operation unit 312 issues a photograph taking instruction to the imaging unit 316 and at the same time outputs a signal intensity measurement instruction to the measuring unit 212.

In response to the signal intensity measurement instruction from the operation unit 312, the measuring unit 212 measures a signal intensity of a signal transmitted from the base station 30. The imaging unit 316 acquires photographic information in response to the photograph taking instruction from the operation unit 312. Namely, according to the receiving apparatus 70 of this embodiment, measurement of a signal intensity at the measuring unit 212 is performed synchronously with acquisition of photographic information at the imaging unit 316.

Based on the signal intensity measurement at the measuring unit 212, the data processing unit 220 records the measurement time, base station identification information and signal intensity information respectively correlated to each other, in the information storage unit 724. The data processing unit 220 also records the photographic information acquired by the imaging unit 316 related to the record time, in the information storage unit 724. In this embodiment, since the measurement time and record time is the same time or approximately the near time, the data processing unit 220 may record in the information storage unit 724 the correlated measurement time or record time, base station identification information, signal intensity information and photographic information.

The information storage unit 724 functions as a storage unit, history storage medium or information storage medium for storing information on the correlated measurement time, base station identification information and signal intensity information, and information on the correlated photographic information and record time. Alternatively, the information storage unit 724 stores information on the correlated measurement time or record time, base station identification information, signal intensity information and photographic information.

As above, according to the receiving apparatus 70 of this embodiment, the measuring unit 212 measures a signal intensity synchronously with a record timing of the photographic information. As a result, highly reliable position information can be correlated to photographic information, without extracting signal intensity information at a measurement time nearest to the record time of photographic information and without correcting position information, respectively on the PC 40 side.

FIG. 17 is a sequential diagram illustrating the overall operation flow of the position information processing systems 60 and 62 of the embodiment. First, the receiving apparatus 70 receives a photograph taking instruction via the operation unit 312 (S800). In response to the reception of the photograph taking instruction, the measuring unit 212 of the receiving apparatus 70 measures a signal intensity, the imaging unit 316 acquires photographic information, and the data processing unit 220 stores the signal intensity information and photographic information in the information storage unit 724 (S804).

Next, the receiving apparatus 70 is connected to PC 40 (S808). Thereafter, the receiving apparatus 70 transmits the signal intensity information and photographic information to PC 40 (S812). PC 40 transmits the signal intensity information together with a position estimating request to the position estimating apparatus 50 (S816). Based on the signal intensity information received from PC 40, the position estimating apparatus 50 estimates position information of the receiving apparatus 70 at the measurement time of record time (S820). Thereafter, the position estimating apparatus 50 transmits the estimated position information to PC 40 (S824). Next, PC 40 correlates the position information received from the position estimating apparatus 50 to the photographic information (S828).

As above, according to the second embodiment of the present invention, measuring a signal intensity is performed synchronously with recording photographic information. Namely, since the receiving apparatus 70 measures a signal intensity only when necessary, it is possible to improve the retention of the power source of the receiving apparatus 70. Further, since only necessary signal intensity information is recorded in the receiving apparatus 70, a capacity of the information storage unit 724 can be reduced.

The preferred embodiments of the present invention have been described with reference to the accompanying drawings. Obviously, the present invention is not limited only to the embodiments. It is apparent that those skilled in the art could think of various changes and modifications without departing from the range of the scope of appended claims. These changes and modifications are construed as belonging to the technical scope of the present invention.

For example, although PC 40 and position estimating apparatus 50 are separately structured in the embodiments, the position estimating function may be provided in PC 40. More specifically, base station information is stored in the storage unit 428 of PC 40, and PC 40 is provided with a position estimating unit capable of estimating position information based on the base station information and signal intensity information. With this arrangement, it is not necessary for PC 40 to access the position estimating apparatus 50 via a network to acquire the position information. Therefore, PC may acquire the position information speedily.

In the description of the first embodiment, although the receiving apparatus 20 and imaging apparatus 24 are coupled via a connection device, it may adopt the arrangement for facilitating a motion of the receiving apparatus 20 and imaging apparatus 24 at the same time. For example, the receiving apparatus 20 may be a wrist watch type or a necklace type.

Each step in the processes to be executed by the position information processing systems 10, 12, 60 and 62 in this specification contains not only a process to be executed time sequentially in the order described in the flow chart or sequential diagram but also a process to be executed parallel or independently without being processed time sequentially (e.g., a process by parallel processing or objects).

The present invention also provides a program for making a computer execute the above-described position information processing and a storage medium storing the program.

It should be understood by those skilled in the art that various modifications, combinations, sub-combinations and alternations may occur depending on design requirements and other factors insofar as they are within the scope of the appended claims or the equivalents thereof.

The present application claims benefit of priority of Japanese patent Application No. 2006-313425 filed in the Japanese Patent Office on Nov. 20, 2006, the entire content of which being incorporated herein by reference.

What is claimed is:

1. A position information processing method using a communication apparatus capable of wireless communicating with a plurality of base stations, and an information recording apparatus capable of recording information matching an arbitrary position environment, the method comprising the steps of:
   measuring, at the communication apparatus, a signal intensity of a signal transmitted from each of the plurality of base stations;
   recording a history of signal intensity information at one or more times in a history storage medium of the communication apparatus, the history of signal intensity information including the measured signal intensity or information obtained from the measured signal intensity, base station identification information uniquely assigned to each of the base stations, and a time concerning measurement of the signal intensity, respectively correlated to each other;
   recording, in an information storage medium of the information recording apparatus, a specific time and information matching a position environment of the information recording apparatus at the specific time, respectively correlated to each other;
   calculating position information of the communication apparatus at the specific time based on the history of signal intensity information and known base station information, the history of signal intensity information being recorded in the history storage medium, and the known base station information being constituted of the base station identification information of the base stations and position information of the base stations correlated to each other, wherein the calculating step comprises the steps of:
   obtaining first position information calculated based on signal intensity information correlated to a first time nearest to the specific time and before the specific time;
   obtaining second position information calculated based on signal intensity information correlated to a second time nearest to the specific time and after the specific time;
   determining a weight coefficient for the first position information and the second position information, based on a ratio of a time from the first time to the second time to a time from the specific time to the second time; and
   calculating the position information of the communication apparatus at the specific time from the first position information and the second position information, by using the weight coefficient; and
   correlating the calculated position information to the information matching the position environment, the information matching the position environment being correlated to the specific time and stored in the information storage medium.

2. The position information processing method according to claim 1, wherein the information recording apparatus and the communication apparatus are structured separately.

3. The position information processing method according to claim 2, wherein the signal intensity in the measuring step is measured at a predetermined time interval.

4. The position information processing method according to claim 3, wherein the calculating step calculates the position information of the communication apparatus at the specific time based on signal intensity information correlated to a time nearest to the specific time.

5. The position information processing method according to claim 1, wherein the information recording apparatus is structured integrally with the communication apparatus.

6. The position information processing method according to claim 1, further comprising the step of:
   instructing, by the information recording apparatus, to measure the signal intensity at the specific time when recording the information matching the position environment of the information recording apparatus,
   wherein the signal intensity in the measuring step is measured in response to the instruction.

7. A position information processing system comprising:
   a communication apparatus capable of communicating with a plurality of base stations;
   a position information processing apparatus connectable to the communication apparatus; and
   an information recording apparatus for recording information matching an arbitrary position environment,
   wherein the communication apparatus includes:
       a measuring unit for measuring a signal intensity of a signal transmitted from each of the plurality of base stations;
       a storage unit configured to store a history of signal intensity information at one or more times, the history of signal intensity information including the signal intensity measured by the measuring unit or information obtained from the signal intensity, base station identification information uniquely assigned to each of the base stations, and a time concerning measurement of the signal intensity, respectively correlated to each other; and
       a transmitting unit configured to transmit the history of signal intensity information stored in the storage unit to the position information processing apparatus; and
   the position information processing apparatus includes:
       a signal intensity information receiving unit configured to receive the history of signal intensity information from the communication apparatus;
       a record time receiving unit configured to receive a record time from the information recording apparatus when the information recording apparatus recorded the information matching the position environment of the information recording apparatus; and
       a data processing unit configured to correlate the position information of the communication apparatus at the record time to the information matching the position environment, the position information being calculated based on the history of signal intensity information and known base station information constituted of the base station identification information of the base stations and position information of the base stations correlated to each other, and the information matching the position environment being correlated to the record time and recorded by the information recording apparatus, wherein calculating the position information comprises the steps of:

obtaining first position information calculated based on signal intensity information correlated to a first time nearest to the specific time and before the specific time;

obtaining second position information calculated based on signal intensity information correlated to a second time nearest to the specific time and after the specific time;

determining a weight coefficient for the first position information and the second position information, based on a ratio of a time from the first time to the second time to a time from the specific time to the second time; and calculating the position information of the communication apparatus at the specific time from the first position information and the second position information, by using the weight coefficient.

8. A position information processing apparatus connectable to a communication apparatus capable of communicating with a plurality of base stations, the position information processing apparatus comprising:

a signal intensity information receiving unit configured to receive from the communication apparatus a history of signal intensity information at one or more times, the history of signal intensity information including a signal intensity of a signal transmitted from each of the base stations and measured at the communication apparatus or information obtained from the signal intensity, base station identification information uniquely assigned to each of the base stations, and a time concerning measurement of the signal intensity, respectively correlated to each other;

a record time receiving unit configured to receive a record time when the information recording apparatus recorded information matching a position environment of the information recording apparatus, from an information recording apparatus capable of recording information matching an arbitrary position environment; and a data processing unit configured to correlate the position information of the communication apparatus at the record time to the information matching the position environment, the position information being calculated based on the history of signal intensity information and known base station information constituted of the base station identification information of the base stations and position information of the base stations correlated to each other, and the information matching the position environment being correlated to the record time and recorded by the information recording apparatus, wherein calculating the position information comprises the steps of:

obtaining first position information calculated based on signal intensity information correlated to a first time nearest to the specific time and before the specific time;

obtaining second position information calculated based on signal intensity information correlated to a second time nearest to the specific time and after the specific time;

determining a weight coefficient for the first position information and the second position information, based on a ratio of a time from the first time to the second time to a time from the specific time to the second time; and calculating the position information of the communication apparatus at the specific time from the first position information and the second position information, by using the weight coefficient.

9. A communication apparatus capable of communicating with a plurality of base stations, comprising:

a measuring unit to configured to measure a signal intensity of a signal transmitted from each of the plurality of base stations;

a storage unit configured to store a history of signal intensity information at one or more times, the history of signal intensity information including the signal intensity measured by the measuring unit or information obtained from the signal intensity, base station identification information uniquely assigned to each of the base stations, and a time concerning measurement of the signal intensity, respectively correlated to each other; and a transmitting unit configured to transmit the history of signal intensity information stored in the storage unit to a position information processing apparatus capable of obtaining position information of the communication apparatus at a specific time by using the history of signal intensity information and known base station information constituted of the base station identification information of the base stations and position information of the base stations correlated to each other, wherein obtaining position information comprises the steps of:

obtaining first position information calculated based on signal intensity information correlated to a first time nearest to the specific time and before the specific time;

obtaining second position information calculated based on signal intensity information correlated to a second time nearest to the specific time and after the specific time;

determining a weight coefficient for the first position information and the second position information, based on a ratio of a time from the first time to the second time to a time from the specific time to the second time; and calculating the position information of the communication apparatus at the specific time from the first position information and the second position information, by using the weight coefficient.

10. The communication apparatus according to claim 9, wherein the measuring unit measures the signal intensity at a predetermined time interval.

11. The communication apparatus according to claim 9, further comprising a recording unit configured to record information matching a position environment of the communication apparatus in the storage unit, wherein the measuring unit measures the signal intensity based on a record of the information matching the position information of the communication apparatus.

12. A non-transitory computer-readable medium encoded with a computer program, the program comprising the steps of:

measuring a signal intensity of a signal transmitted from each of a plurality of base stations;

recording a history of signal intensity information at one or more times in a history storage medium, the history of signal intensity information including the measured signal intensity or information obtained from the measured signal intensity, base station identification information uniquely assigned to each of the base stations, and a time based upon the measuring step, respectively correlated to each other;

recording, by an information recording apparatus capable of recording information matching a position information record in an information storage medium, information matching a position environment of the information recording apparatus at a specific time and the specific time, respectively correlated to each other;

calculating position information of the communication apparatus at the specific time, based on the history of signal intensity information recorded in the history storage medium, and known base station information constituted of the base station identification information of the base stations and position information of the base stations correlated to each other; and correlating the calculated position information to the information matching the position environment, the information matching the position environment being correlated to the specific time and stored in the information storage medium, wherein the calculating step comprises the steps of:

obtaining first position information calculated based on signal intensity information correlated to a first time nearest to the specific time and before the specific time;

obtaining second position information calculated based on signal intensity information correlated to a second time nearest to the specific time and after the specific time;

determining a weight coefficient for the first position information and the second position information, based on a ratio of a time from the first time to the second time to a time from the specific time to the second time; and calculating the position information of the communication apparatus at the specific time from the first position information and the second position information, by using the weight coefficient.

* * * * *